US00RE33973E

United States Patent [19]

Kriz et al.

[11] E Patent Number: Re. 33,973

[45] Reissued Date of Patent: Jun. 23, 1992

[54] IMAGE GENERATOR HAVING AUTOMATIC ALIGNMENT METHOD AND APPARATUS

[75] Inventors: J. Stanley Kriz, Fairfax, Va.; William H. Glass, Edina; Thor A. Olson, Minneapolis, both of Minn.

[73] Assignee: Management Graphics, Inc., Minneapolis, Minn.

[21] Appl. No.: 542,251

[22] Filed: Jun. 21, 1990

Related U.S. Patent Documents

Reissue of:

[64] Patent No.: 4,754,334
Issued: Jun. 28, 1988
Appl. No.: 1,456
Filed: Jan. 8, 1987

[51] Int. Cl.[5] ..... H04N 5/84

[52] U.S. Cl. ..... 358/244; 354/76; 358/345; 395/101

[58] Field of Search ..... 354/75, 76; 358/244, 358/244.1, 345; 364/521, 525

[56] References Cited

U.S. PATENT DOCUMENTS 2,571,306 10/1951 Szegho .
2,587,074 2/1952 Sziklai .
2,604,534 7/1952 Graham .
2,654,854 10/1953 Seright .
2,706,216 4/1955 Lesti .
2,753,451 7/1956 Cetrone .
2,827,591 3/1958 Bowie .

(List continued on next page.)

FOREIGN PATENT DOCUMENTS 1134287 8/1962 Fed. Rep. of Germany .
834025 5/1960 United Kingdom .
1029016 5/1966 United Kingdom .
1535665 12/1978 United Kingdom .

*Primary Examiner*—Russell E. Adams
*Attorney, Agent, or Firm*—Barry R. Lipsitz

[57] ABSTRACT

An image recorder for providing a CRT image and apparatus to store the image on a film disposed on a film plane. The relative position, intensity and focus parameters of the image are measured during an initial startup of the image recorder, wherein the position, intensity and focus parameters of the CRT and the image thereon are automatically aligned to assure enhanced performance. The apparatus according to the present invention provides an alignment mask disposed in the CRT plane and the CRT parameters are measured by observation of the light collected through the alignment mask from the CRT and processing the corresopnding light intensity signals. The light sensing device provides a signal which is processed typically by a microprocessor controlled geometry engine to derive a set of correction data which is based on a prototype array of initialized data values. The correction data provide signals which are combined with uncorrected CRT deflection signals to provide a corrected signal. The parameters corrected by the apparatus and method according to the present invention include x and y position, focus and relative picture intensity over the surface of the screen (vignette). The above-listed parameters are used alone and in combination to provide image centering, image scaling and pincushion correction, correction for non-orthogonality between the x and y deflection coils, image rotation and correction for nonlinear second and third order effects. The set of data can also be deliberately distorted to provide image precompensation such as keystone (trapezoid) and spherical corrections as well as vignette compensation such that, when the final image is projected or displayed, a true (nondistorted) image results.

54 Claims, 10 Drawing Sheets

U.S. PATENT DOCUMENTS

| | | |
|---|---|---|
| 2,851,525 | 9/1958 | Kihn . |
| 2,881,354 | 4/1959 | Keizer . |
| 3,237,048 | 2/1966 | Slvaik . |
| 3,319,112 | 5/1967 | Annus et al. . |
| 3,322,033 | 5/1967 | Silverman . |
| 3,358,184 | 12/1967 | Vitt . |
| 3,358,239 | 12/1968 | Franke et al. . |
| 3,389,294 | 6/1968 | Shaw . |
| 3,403,288 | 9/1968 | Bradley et al. . |
| 3,403,289 | 9/1968 | Garry . |
| 3,404,220 | 10/1968 | Favreau . |
| 3,422,305 | 1/1969 | Infante . |
| 3,435,278 | 3/1969 | Carlock et al. . |
| 3,488,119 | 1/1970 | Dixon et al. . |
| 3,566,181 | 2/1971 | Figlewicz . |
| 3,588,584 | 6/1971 | Tubinis . |
| 3,609,219 | 9/1971 | Diehl . |
| 3,673,932 | 7/1972 | Rottmiller . |
| 3,673,933 | 7/1972 | Hamann . |
| 3,678,190 | 7/1972 | Cook . |
| 3,714,496 | 1/1973 | Horvath . |
| 3,714,501 | 1/1973 | Erickson . |
| 3,715,620 | 2/1973 | Marro . |
| 3,740,608 | 6/1973 | Manber et al. . |
| 3,743,883 | 7/1973 | Burns . |
| 3,836,926 | 9/1974 | Seitz et al. . |
| 3,889,115 | 6/1975 | Tamura et al. . |
| 3,930,261 | 12/1975 | Stauffer . |
| 3,970,894 | 7/1976 | Yasuda et al. . |
| 4,281,927 | 8/1981 | Dzuban . |
| 4,285,004 | 8/1981 | Morrison et al. . |
| 4,287,506 | 9/1981 | Richards . |
| 4,321,510 | 3/1982 | Takigawa . |
| 4,353,013 | 10/1982 | Lehman . |
| 4,354,243 | 10/1982 | Ryan et al. . |
| 4,383,274 | 5/1983 | Inuiya . |
| 4,422,020 | 12/1983 | Lehnert et al. . |
| 4,456,863 | 6/1984 | Robinder et al. . |
| 4,469,438 | 9/1984 | Itikawa . |
| 4,509,077 | 4/1985 | Therrien . |
| 4,521,104 | 6/1985 | Craig . |
| 4,533,950 | 8/1985 | Harshbarger . |
| 4,620,790 | 11/1986 | Hufnagel . |

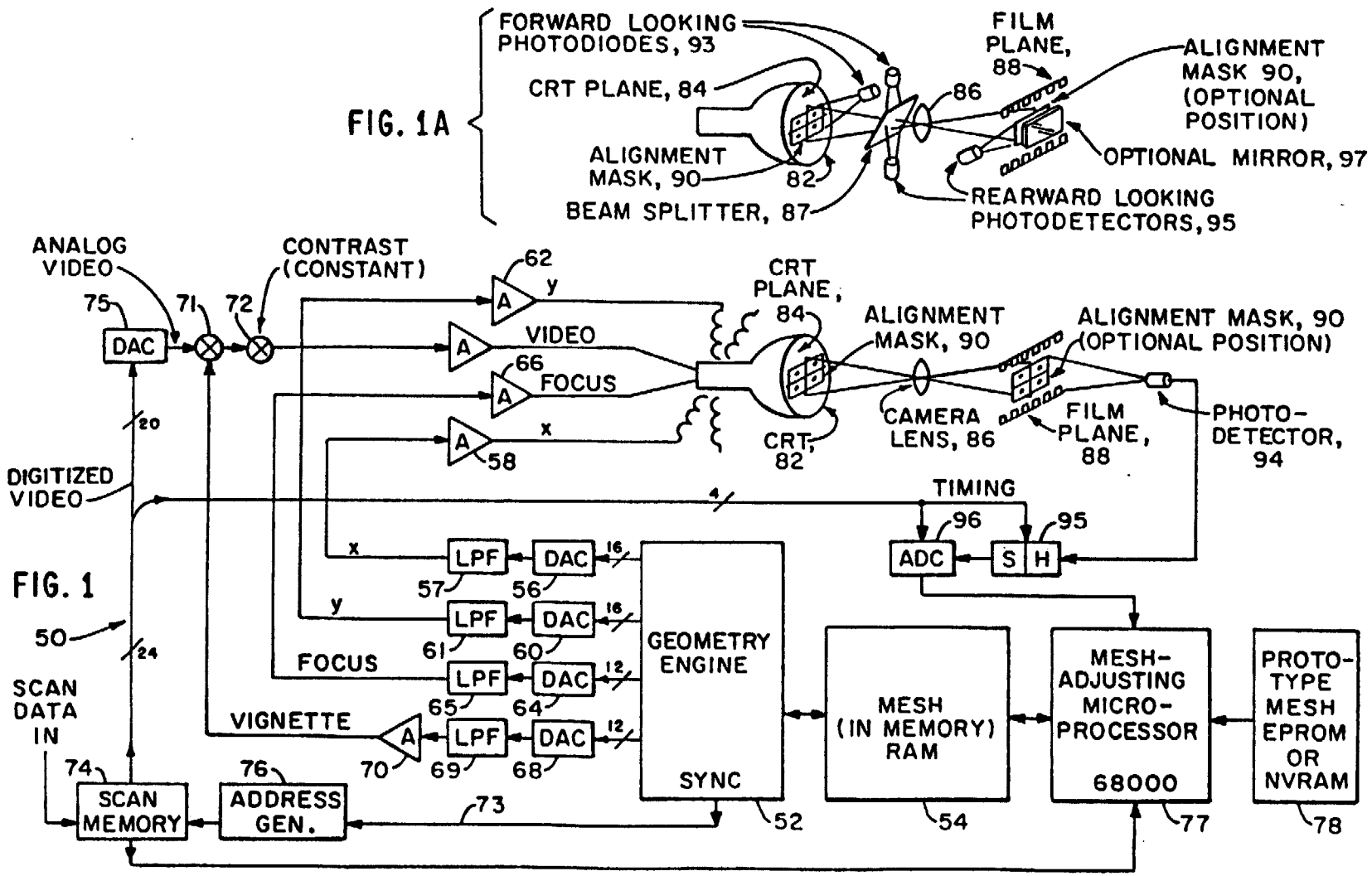
FORWARD LOOKING PHOTODIODES, 93
CRT PLANE, 84
ALIGNMENT MASK, 90
BEAM SPLITTER, 87
82
86
FILM PLANE, 88
REARWARD LOOKING PHOTODETECTORS, 95
OPTIONAL MIRROR, 97
ALIGNMENT MASK 90, (OPTIONAL POSITION)
FIG. 1A
CRT PLANE, 84
CRT, 82
ALIGNMENT MASK, 90
CAMERA LENS, 86
FILM PLANE, 88
ALIGNMENT MASK, 90 (OPTIONAL POSITION)
PHOTO-DETECTOR, 94
TIMING
96
95
S H
ADC
4
VIDEO
FOCUS
x
y
62
66
58
A
CONTRAST (CONSTANT)
72
71
DAC
75
ANALOG VIDEO
20
DIGITIZED VIDEO
FIG. 1
50
24
SCAN DATA IN
74
SCAN MEMORY
76
ADDRESS GEN.
73
VIGNETTE
70
LPF
57
61
65
69
DAC
56
60
64
68
16
12
GEOMETRY ENGINE
SYNC
52
MESH (IN MEMORY) RAM
54
MESH-ADJUSTING MICRO-PROCESSOR 68000
77
PROTO-TYPE MESH EPROM OR NVRAM
78

FILM PLANE COORDINATES

ALIGNMENT MASK

MESH ARRAY INDICES
&
MESH CONTROL SURFACE

MESH ARRAY INDICES
SUPERPOSED ON FILM IMAGE $$r = \pm\sqrt{u^2 + v^2}$$

OFFSET & SCALE IN THE FOCUS MESH

RESAMPLING THE FOCUS MESH y AXIS
ORTHOGONALITY

MESH ROTATION

MESH INTERPOLATION

IMAGE GENERATOR HAVING AUTOMATIC ALIGNMENT METHOD AND APPARATUS

Matter enclosed in heavy brackets [ ] appears in the original patent but forms no part of this reissue specification; matter printed in italics indicates the additions made by reissue.

FIELD OF THE INVENTION

The present invention relates to image [recorders] *generators* and, in particular, image recorders providing an automatically aligned and adjusted image on a film plane from a CRT image.

BACKGROUND OF THE INVENTION

Previous image recorders providing film copies of CRT images require precise mechanical, optical and electronic adjustments to provide the optimum reproduction image quality. Furthermore, the adjustments, having been made, require constant attention and readjustment to maintain the performance of the image recorder apparatus. The individual adjustment parameters of the image recorder may either be adjusted independently or if necessary, adjusted in combination due to the interaction of the various signals in the image recorder apparatus. Moreover, the adjustment is further complicated by the two-dimensional nature of the image recorder, requiring the adjustments to be provided in both dimensions. In spite of the extremely complex nature of the alignment apparatus and processes, a practical image recorder must maintain the alignment and provide for realignment with minimal interruption with the use of the image recorder.

For various reasons, it is inappropriate to do all images at highest resolution. But, for pictures done with differing resolutions, e.g., 4000 and 2000 lines, the resulting color renditions do not match. Thus exact color matching of different resolutions is important.

SUMMARY OF THE INVENTION

The image recorder according to the present invention provides complete automatic alignment of the various parameters controlling the creation of an image on the plane of the film and precise color control and matching of images of different pixel densities. The apparatus and process according to the present invention provides the adjustment and alignment preceding use of the image recorder. Thereafter, the image recorder is available for use, having the parameters optimally adjusted.

The CRT beam in the image recorder of the present invention is controlled by an array of numeric values. The entries in the array correspond to beam position, focus and intensity level. One difficulty in determining the exact value for each entry in the array is that the array entries only indirectly control the beam characteristics. In between the array of numbers of "mesh" and the CRT plane are system components which perform interpolations, filtering, and delay operations on the values. A "prototype" mesh is generated for an idealized system which models the image recorder characteristics.

No model is perfect and there are errors and inaccuracies in the model used for the generation of the mesh. In addition, there will be manufacturing variations and tolerances. Because of these factors, it is necessary to "tune" the mesh for each individual image recorder.

The present invention comprises a process of automatically adjusting the values of the "prototype" mesh to meet the acceptance criteria and limitations of the produced film image and will be referred to as mesh alignment.

The apparatus according to the present invention can also modify the mesh values to "predistort" the resulting image in a controlled manner to obtain images which will be correct after projection. For instance, if a projector is angled upward at the screen, the image is distorted into a "keystone." The present invention permits the film image to be predistorted so that the projected image is rectilinear. Further, the modifications to the mesh can also create selected special effects.

The modifications to the prototype mesh are generated by a set of measurements which characterize the specific image recorder. These measurements contain the invention necessary to supply the parameters for all of the required operations on the prototype mesh. The apparatus according to the present invention performs the necessary measurements, and the corresponding mathematical operations in order to produce a corrected prototype mesh which meets the acceptance criteria.

Thus, according to the present invention, the prototype mesh is stored in Read Only Memory (ROM) in the image recorder. The measurements and/or parameters may be stored in nonvolatile read/write memory. At power-up the alignment operations on the prototype mesh are computed and the resulting mesh used for imaging.

BRIEF DESCRIPTION OF THE DRAWING

These and other features according to the present invention will be better understood by reading the following detailed description, taken together with the drawing, wherein:

FIG. 1 is a block diagram of one embodiment of the image recorder automatic alignment system according to the present invention;

FIG. 1A shows an alternate embodiment of the alignment of the optical elements of the system of FIG. 1;

[FIG. 4 is]

FIGS. 16A-D are four encoded aperture plates in more detail.

DETAILED DESCRIPTION OF THE INVENTION

Figure 2:
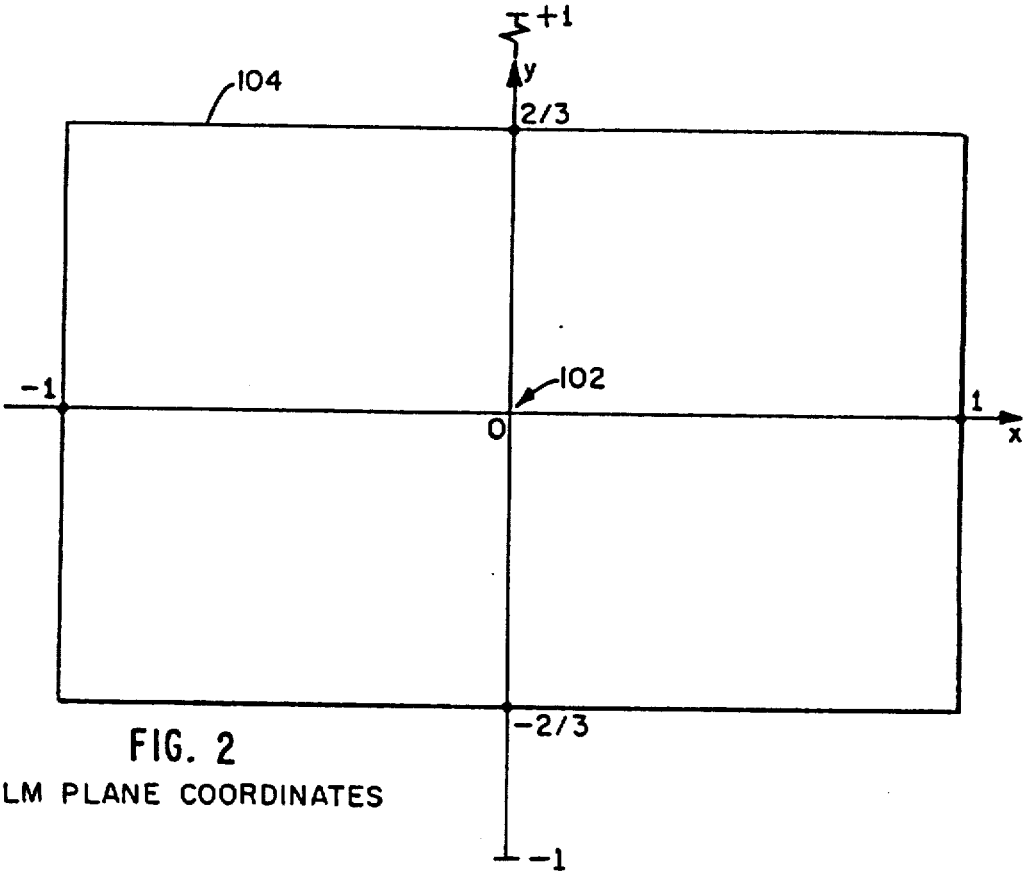
FIG. 2 is a drawing showing the film plane coordinates and an example of 35 mm slide coordinates.

A bock diagram 50 in FIG. 1 of the apparatus according to the presentation includes a cathode ray tube (CRT) 82 which provides an image on an image plane, which for this embodiment is also a CRT plane 84 and is projected on the film plane 88 by a camera lens 86.

The image on the CRT plane 84 is generated from scan data stored in a scan memory 74. The scan memory 74 provides 20 bits of digitized RGB video to digital-to-analog converter (DAC) 75, which provides an analog video output and four bits of control timing to the analog-to-digital converter (ADC) 96, the integrator reset circuit, and the sample and hold (S/H) circuit 95 which digitizes the photodetector 94 signal. The scan memory 74 addresses are provided by an address generator 76 synchronized by the geometry engine 52 so that the operation of the geometry engine corresponds to the image generated from the scan memory 74. The scan memory is controlled by a microprocessor, which may include the mesh adjusting microprocessor 77. The system is aligned according to an alignment mask 90 inserted at the CRT plane 84. A movable spot is provided on the CRT plane 84 of the CRT 82 and is selectively obscured by the pattern on the alignment mask 90 (shown in FIG. 3). More generally, the alignment mesh can be any device which comprises a variable density optical element which produces variations in the spot intensity in the photodetector optical path. The portion of the light which is not obscured is received by a photodetector 94.

The alternate embodiments of the alignment mask 90 and photodetector 94 placement includes placing the mask 90 at the film plane at a focal point of the camera lens 86. When the mask 90 is operative at the film plane, the photographic film and the alignment mask are each in individual interchangeable modules (not shown) which are received in front of the CRT plane. Each such module also includes the necessary optics. Examples of further alternate embodiments in alignment mask position are shown in FIG. 1A. The alignment mask 90 can overlay the CRT on the CRT plane 84, and the photodetector 93 receives light directly or indirectly from a beamsplitting or movable mirror 87, from the CRT plane. The mask 90 may also be located at the film plane 88, such that light reflected from the mask is received by a rearward-looking photodetector 95, either directly or indirectly from a beam splitter 87 in the optical path. Moreover, a mirror 97 may be introduced at the film plane 898 to reflect light to the photodetector 95 from the transmissive portions of the alignment mask 90.

A signal from the photodetector 94 is received by sample-and-hold 95 and converted to a digital number by an analog-to-digital converter (ADC) 96. The resulting digital signal is received by the microprocessor, discussed in detail below. The geometry engine is controlled to produce an image to coincide with an eternal signal, including a sync signal on lead 73. The geometry engine provides an x deflection signal which is received and converted to an analog signal by DAC 56. The analog signal is received and filtered by a low pass filter (LPF) 57 and amplified by an amplifier 58 and received by the deflection coils or other deflection device by the CRT. Similarly, the geometry engine 52 provides a y deflection signal which is converted by SAC 60 filtered by the LPF 61 and amplified at 62. The focus signal is also generated by the geometry engine 52 and converted to an analog signal by DAC 64, filtered by the LPF 65 and drives the appropriate CRT grid by amplifier 66.

The above-described signals generated by the geometry engine 52 are adjusted or corrected by signals stored in the mesh random access memory (RAM) 54 and from interpolation between the stored signals, described below. The mesh signals in RAM 54 are based on a prototype mesh stored in nonvolatile memory (NVRAM or EPROM) 78. A mesh adjusting microprocessor 77 processes the prototype mesh 78 values according to the digitized intensity signal from ADC 96 and according to the processes described below, storing the results in the mesh RAM 54.

An observed phenomenon in image recorders which record images from the face of the CRT is the variation in image brightness over the image plane of the CRT. Specifically, the image brightness is greater in the center of the CRT film plane and diminishes at the outward extremes. This phenomenon, termed "vignetting" hereinafter, is corrected by the appartus of the present invention by scaling or multipying the DAC 75 output signal with a signal multiplier 71 which also receives a variable vignette signal from the geometry engine 52. A contrast DAC 72 multiplies the video signal by a contrast signal. The vignette signal is converted to an analog signal by DAC 68, filtered by LPF 69 and amplified by amplifier 70 before being received by the multiplier 71.

The geometry engine 52 provides the deflection signals to provide the necessary beam deflection to create an image according to the stored video signal in the scan memory 74. The aformentioned system parameters are adjusted by mesh signals in the mesh RAM 54 by the geometry engine 52 according to the present invention to provide corrections for various system errors discussed below.

Photodetector 94 measurements provide the information required for tuning or adjustment of the prototype mesh in ROM 78. They are made by positioning the beam at a target point on the CRT and monitoring the light amplitude at the photodetector. Absolute XY position can be determined by inspecting the spot intensity as it is positioned near edges and corners of targets 100 on the alignment mask (90, FIG. 3). A profile of the spot (the brightness or energy of the spot as a function of a position along a line through the spot) can be obtained by measuring successive intensities as the spot is moved gradually past an opaque edge of the mask.

There are numerous entities in the system for aligning the prototype mask, each entity with its specific coordinate system. To reduce confusion, and provide a foundation to the mathematical description of the process, it is necessary to relate the various coordinate systems to each other.

First, there is obviously a physical coordinate system which specifies in "real world" space the dimensions and positions of things. The frame size of a 35 mm film image has an expected ratio of 2:3 specified as 24 mm by 36 mm. The equations in this specification reflect the 2:3 aspect ratio; other film formats are accommodated by varying the appropriate equations and calculations accordingly. It is convenient to establish a "normalized" coordinate system on the frame of the image, FIG. 2. The origin is at the center of the frame 102. The horizontal axis will be denoted "X" and extends from −1.0 at the left to +1.0 at the right of the frame. The vertical "Y" Axis extends from −1.0 at the bottom to +1.0 at the top of the frame or −⅔ and +⅔ for a 35 mm slide.

A prototype mesh (data in ROM 78) is formed which has several coordinate systems attached to it. The term prototype refers to the initial values of the system elements, and are subject to change by microprocessor 77 according to the self-adjusting process of the present invention. One coordinate system is the array indices of the mesh. These are integers, call them j and k, and they correspond to the sequence in which the geometry engine fetches the contents of the array. The organization is in rows and columns. A row can be considered to correspond to the horizontal scan of the CRT beam. Successive rows are accessed as the beam moves down the screen.

Figure 6:
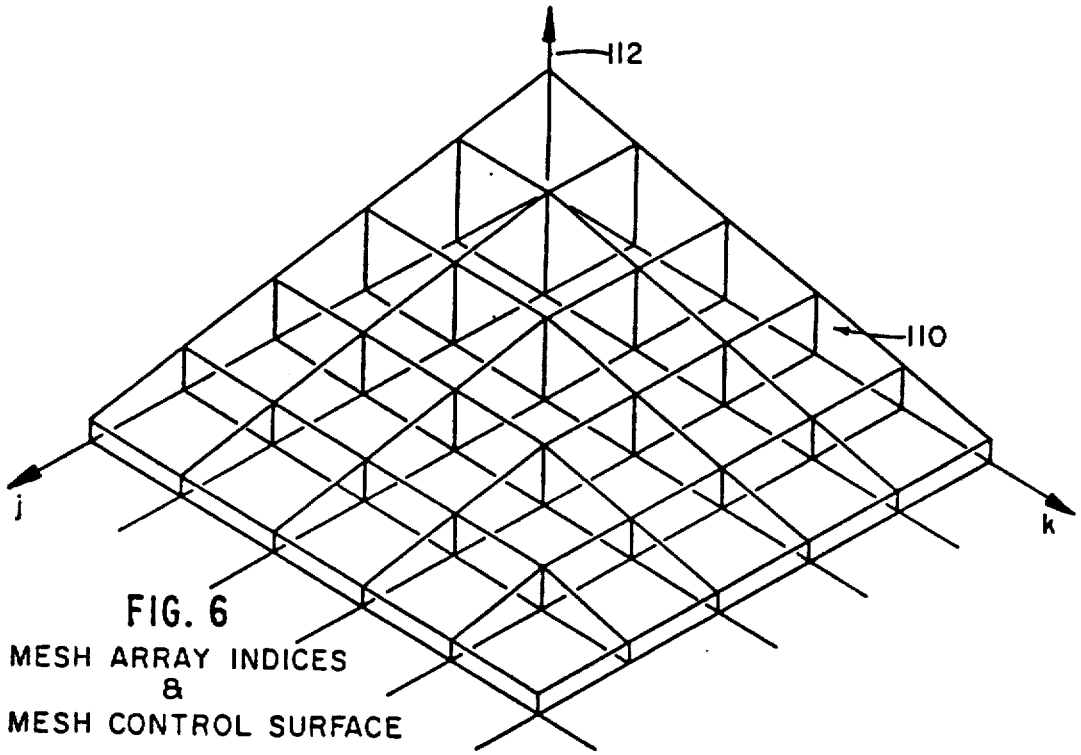
FIG. 6 is a perspective view of a typical mesh array and control surface.

Each beam control parameter (x and y position, focus and vignette) has its own two dimensional array. Since each element of the array holes a scalar value 112, the array can be viewed as samples of a surface 110 defined over the range of array indices in FIG. 6. Each beam parameter has its control surface 110.

Figure 7:
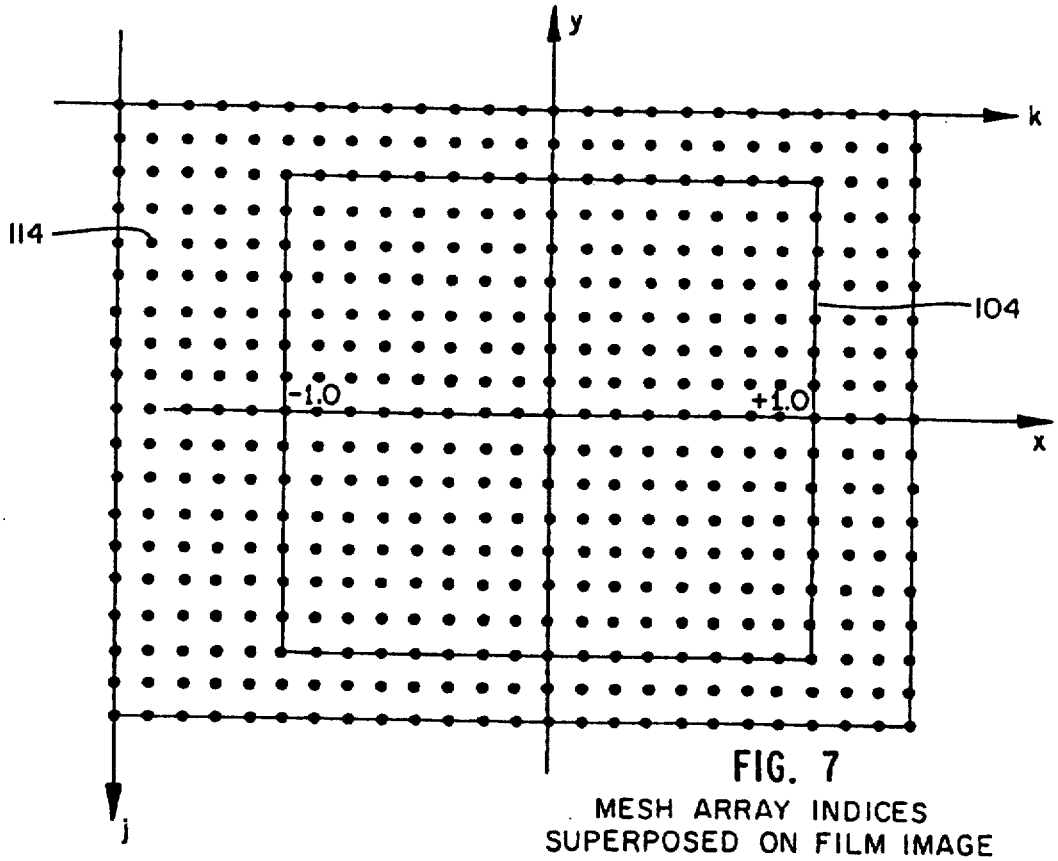
FIG. 7 is a drawing showing the mesh array indices superimposed on a film image.

In FIG. 7, note that the array indices j,k map onto the X–Y image frame coordinates of FIG. 2. That is, a row of the mesh represents points on a horizontal line in the image. A column corresponds exactly to a vertical line in the image. In practice, the mesh contains additional samples 114 beyond the frame 104 to implement retract of the CRT beam.

Because many of the operations for geometry alignment can be easily accomplished using complex numbers, a library of the fundamental vector operations is built which implement complex addition, multiplication, division, and conjugation. Focus and vignette are treated as scalars (or as a subset of complex numbers with imaginary part set to zero).

The order in which the alignment corrections are applied to the prototype mesh is determined by the type of operation required. The three different operation types by their order of precedence are resampling, scaling (multiplicative), and offset correction (additive). The resampling operation can include both the residual distortion and the rotation corrections. The other two operation types can be combined into a single linear mapping step.

Two types of corrections are made to a mesh control surface. First there are gain and offset type corrections. Second, there are corrections which require "resampling" the mesh surface. Resampling refers to the process where new mesh values are obtained by interpolation between the original mesh values which are at integer coordinates.

The measurements, which contain all of the information required for the mesh corrections, are made by positioning the beam at a target point on the alignment mask and monitoring the light amplitude. The alignment mask contains targets in film image coordinates. The beam is controlled by points in the space of the control surfaces. The relationship between the control surface amplitudes and the image coordinates yield the information required for scaling and resampling.

Figure 3:
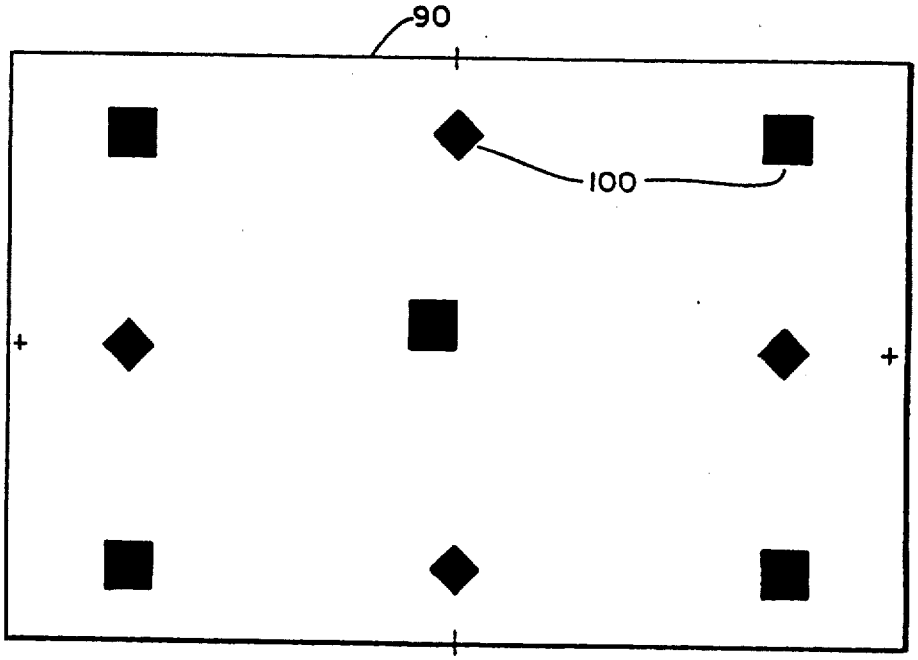
FIG. 3 is a drawing showing one embodiment of the mask according to the present invention.

The locations of the targets 100 on the alignment mask are shown in FIG. 3. The measurements which are required for geometry corrections consist of the X and Y DAC values required to position the beam at the corner of the target. The positioning algorithm conducts a search for the corner of the opaque square 100 in each target. This search can first be carried out on a nonfocussed beam to get a "coarse" position of the target. The beam is then focussed and the search performed again so as to obtain an accurate position of the target.

Figure 4A:
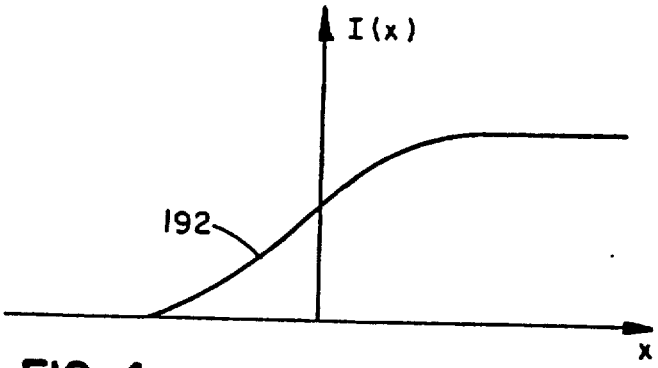
*FIGS. 4a to 4e are* a collection of beam intensity profiles considered in the process of focus adjustment.
Figure 4C:
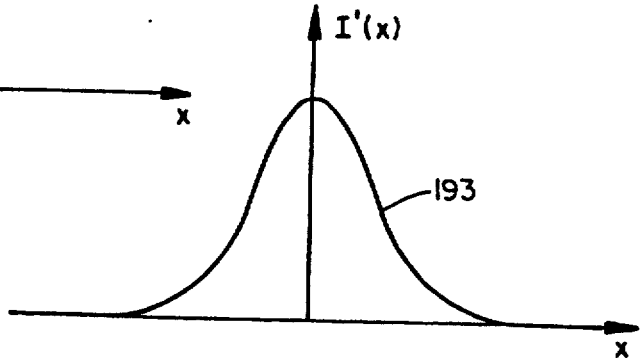
Figure 4B:
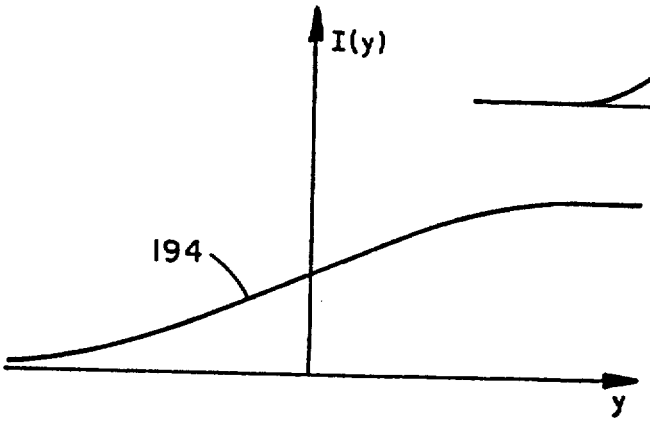
Figure 4D:
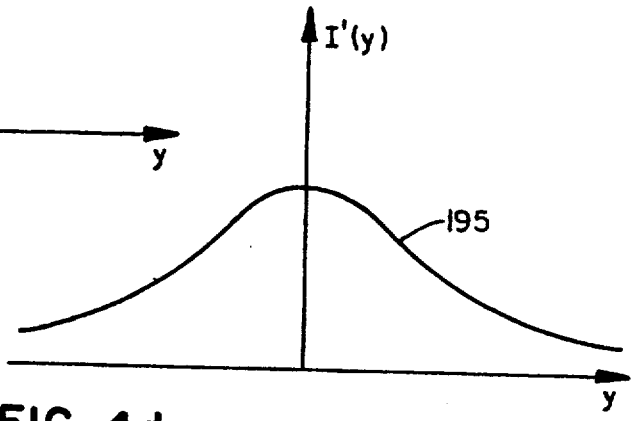
Figure 4E:
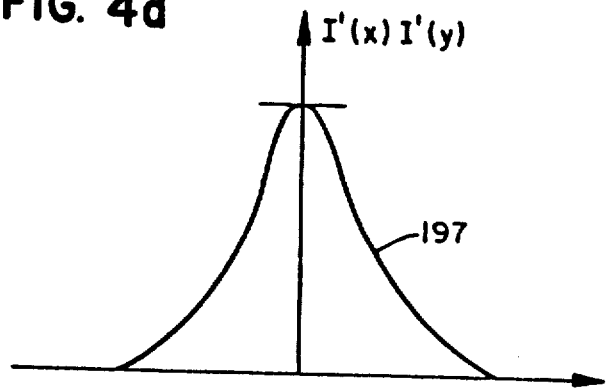

Finding the best focus is done by examining the horizontal 192 and vertical profiles 194 of the spot intensity, shown in [FIG. 4] *FIGS. 4a and 4b*, as the spot is brought out from behind an opaque edge. The respective derivatives 193, 195 of the intensity profile 192, 194 and the product 197 of the intensity derivatives 193, 195 is also shown *in FIGS. 4c, 4d, and 4e, respectively*. Another search is done over the range of focus voltage to find the "best" spot. This will be defined as the spot whose horizontal and vertical profile derivatives, when multiplied together, yield the maximum product. A selectively variable focus signal is then applied to the CRT 82 to control the CRT focus and adjusted for maximum product.

It is also possible to find the focus value by monitoring the light intensity of the spot as the focus voltage is adjusted. For the nonmoving (static) spot, the best focus occurs at the minimum of the light output response.

After the beam has been focussed and positioned, an intensity number should be obtained. This is the amplitude of the photodetector when viewing the spot for a fixed time period. This measurement will be used for establishing the vignette mesh.

For each target on the alignment mask, then, it is possible to obtain the quadruple of numbers $T_x$, $T_y$, $T_f$ and $T_v$. These numbers are integers which represent the DAC values at the target point (except for $T_v$ which is an ADC value from the photodetector). While they may be stored as integers, for the alignment operations that are described below, they will be treated as real, with the range −1 to +1.

The notation for the normalized measurements will use an uppercase T to indicate an alignment mask target, a subscript indicating the specific measurement, and a coordinate pair to specify the target location. Examples of this notation are:

$T_x(\frac{1}{2}, 0)$: X DAC number required to position at this target.

$T_f(1, \frac{2}{3})$: Focus DAC number of best focus at upper right corner for 35 mm slide.

$T_v(-1, 0)$: Intensity measurement at middle left edge.

Sometimes the $T_x$ and $T_y$ numbers will be combined into a complex number. This will be indicated as:

$$T_{xy}(a, b) = T_x(a, b) + iT_y(a, b)$$

Figure 5:
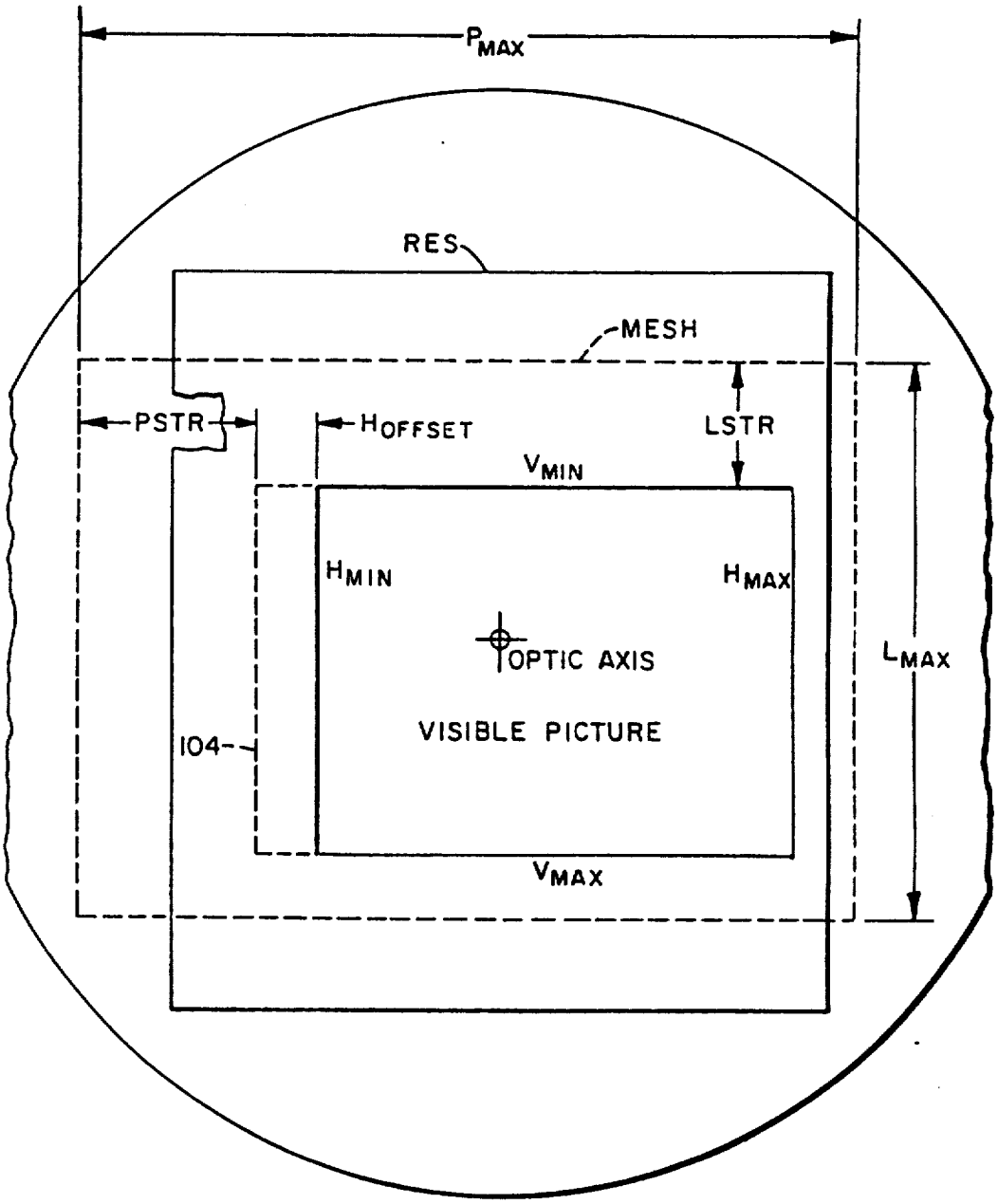
FIG. 5 is a drawing defining the terms used in the detailed description.

The mesh indices form the u, v coordinate system, discussed further below. It is necessary to locate the origin of the mesh array. The actual physical indexing of the array is by row and column integers j, k. To locate the origin index (in integer space) the size, shape and horizontal and vertical offsets of the mesh must be known. This can be obtained from the data structure in which the mesh resides. The parameters of interest are defined in FIG. 5 and below:

Res: resolution of maximum image area.

HMin: location of first visible horizontal pixel.
HMax: location of last visible horizontal pixel.
VMin: location of first visible line (vertical pixel).
VMax: location of last visible line (vertical pixel).
Box: a number of pixels between mesh elements.
PSt: number of pixels from first mesh element to the geometry engine synchronization signal.
HOffset: number of pixels from the pixel sepcified by PStr to first visible pixel.
PMax: number of pixels per row in the mesh-$=\text{Box}*(-k_{max}+1)$.
LStr: number of lines (vertical pixels) from first mesh element to first visible line.
LMax: number of lines per column in the mesh-$=\text{Box}*(j_{max}+1)$.

If the mesh array starts with element M[row, col]=M[0, 0], then the elements of the first (top) visible line are at:

$$J=\text{LStr}/\text{Box}$$

The elements of the first visible pixels on the left hand edge are at:

$$k=(\text{PStr}+\text{HOffset})/\text{Box}$$

Note that these may take fractional values, indicating that the starting pixels do not fall exactly on the mesh coordinates. The center of the entire image space is at Res/2, Res/2. The center of the mesh is at:

$$j_{org}=(\text{Res}/2-\text{VMin}+\text{LStr})/\text{Box}$$

$$k_{org}=(\text{Res}/2-\text{HMin}+\text{PStr}+\text{HOffset})/\text{Box}$$

This alignment procedure uses a standard 35 mm frame format, so some of the above parameters are fixed:

$$\text{Hmin}=0$$

$$\text{HMax}=\text{Res}-1$$

$$\text{HOffset}=0$$

$$\text{Vmin}=\text{Res}/6$$

$$\text{VMax}=5*\text{Res}/6-1$$

Now that the mesh origin indices are unknown, the conversion to the normalized u, v coordinates is:

$$u=2\text{Box}(k-k_{org})/\text{Res}$$

$$v=2\text{Box}(j_{org}-j)/\text{Res}$$

Note that u is a function of column index only, and v is a negative function of row index in order to invert the axis direction to the normalized frame coordinate sense (increasing numbers toward the top).

The retract areas are not considered to be part of the imaging surface. This requires that the boundaries of the image be located in the mesh. The mesh elements just outside of the upper left corner are:

$$j_{ul}=\text{Trunc}(\text{LStr}/\text{Box})$$

$$k_{ul}=\text{Trunc}(\text{PStr}+\text{HOffset}/\text{Box})$$

The mesh elements outside of the lower right corner are:

$$j_{lr}=\text{Trunc}(1+(\text{VMax}-\text{VMin}+\text{LStr}+1)/\text{Box})$$

$$k_{lr}=\text{Trunc}(1+(\text{HMax}-\text{HMin}+\text{PStr}+\text{HOffset}+1)-/\text{Box}$$

These are the boundaries of the image portion of the mesh. All indices within or at these locations are subject to mapping for resampling.

The steps necessary to obtain the alignment factors which will operate on the prototype mesh are shown below.

First, the center of the frame is measured. This is just $T_x(0, 0)$ and $T_y(0, 0)$. Create the complex center number:

$$C=T_x(0,0)+iT_y(0, 0)$$

Second, the deflection gains and beam radii are obtained. Use T(1, 0), T(1, §), and T(0, §) for 35 mm film format examples, to compute values for $K_x$, $K_y$, $Z_x$ and $Z_y$. Correct each of the measurements for the frame center:

$$T_{xy}(a, b)=T_{xy}(a, b)-C$$

Find the values for the X and Y deflection gains.

$$K_x^2=\frac{T_x^2(1, §)-T_x^2(1, 0)}{T_x^2(1, 0)T_x^2(1, §)\cdot(1^2+§^2-1^2-0^2)}$$

$$K_y^2=\frac{T_y^2(1, §)-T_y^2(0, §)}{T_y^2(0, §)T_y^2(1, §)\cdot(1^2+§^2-0^2-§^2)}$$

Then solve for $Z_x$, $Z_y$:

$$Z_x^2=\frac{1^2}{K_x^2T_x^2(1, 0)}-1^2-0^2$$

$$Z_y^2=\frac{§^2}{K_y^2T_y^2(0, §)}-0^2-§^2$$

Four sets of numbers are found, one set for each quadrant of the image. The sets can be averaged in order to obtain a single set of equivalent deflection gains and beam radii or the deflection gain and beam radii can correct the geometry of each quadrant independently.

Third, the inclination of the horizontal axis is determined. Transform the $T_x$, $T_y$ measurements at (−1, 0), (1, 0) to image frame coordinates. Use the two transform steps:

$$T_{1xy}=T_{xy}-C$$

$$T_{2x}=\left[\frac{(Z_x^2+Z_y^2\tan^2K_yT_y)\tan^2K_xT_x}{1-(\tan^2K_yT_y)\tan^2K_xT_x}\right]^{\frac{1}{2}}$$

$$T_{2y}=\left[\frac{(Z_y^2+Z_x^2\tan^2K_xT_x)\tan^2K_yT_y}{1-(\tan^2K_xT_x)\tan^2K_yT_y}\right]^{\frac{1}{2}}$$

Now compute the rotation angle and a correcting complex multiplier, R:

$$\theta_{rot}=\text{atan}\{(T_{2y}(1, 0)-T_{2y}(-1, 0))/T_{2x}(1, 0)-T_{2x}(-1, 0))$$

$$R=\cos(-\theta_{rot})+i\sin(-\theta_{rot})$$

Fourth, the orthogonality correction angle from the top and bottom edge targets $T(0, \frac{2}{3})$ and $T(0, -\frac{2}{3})$ is calculated. These are then transformed to the rotation corrected image frame coordinates. First, $T_{2xy}$ of these target measurements is computed as above, and then corrected for rotation:

$$T_{3xy}=R(-\theta_{rot})\cdot T_{2xy}$$

The orthogonality correction angle and the gradient correction as a function of vertical mesh index v are:

$$\theta_{ortho}=\text{atan}\{(T_{3x}(0, -\tfrac{2}{3})-T_{3x}(0, \tfrac{2}{3})/T_{3y}(0, \tfrac{2}{3})-T_{3y}(0, -\tfrac{2}{3}))\}$$

$$H_{ortho}^{(v)}=-v \tan \theta_{ortho}$$

Fifth, the complex constants used in the residual distortion mapping from the measurements at the corner targets $T(-1, \frac{2}{3})$ and $T(1, -\frac{2}{3})$ are computed. using the same transforms above, $T_{3xy}$ is obtained for these targets. Then the orthogonality correction is applied to the x components of them to obtain $T_{4xy}$:

$$T_{4x}=T_{3x}+H_{ortho}(T_{3y})$$

$$T_{4y}=T_{3y}$$

The three constants required are:

$$A=T_{4xy}(-1, \tfrac{2}{3})T_{4xy}(1, -\tfrac{2}{3})(2-4/3i)$$

$$B=\{T_{4xy}(1, -\tfrac{2}{3})-T_{4xy}(-1, \tfrac{2}{3})\}(-\tfrac{1}{3}+2/9i)$$

$$C=(1-\tfrac{2}{3}i)T_{4xy}(-1, \tfrac{2}{3})-(-1+\tfrac{2}{3}i)T_{4xy}(1, -\tfrac{2}{3})$$

Sixth, the focus levels are measured.

Seventh, the vignette factors are measured.

Having computed the required alignment parameters, the prototype mesh is ready for alignment. The stages are:

1. Resample the mesh to remove residual distortion and rotation.
2. Make a linear correction to each element to correct for orthogonality, pincushion, centering, focus and vignette.

In the first stage, the remapping of the mesh coordinates is formed from a combination of the residual distortion correction and the rotation correction. The steps required to compute the new coordinate locations are described now.

The resampling process requires that for each index of the mesh array, a new index coordinate be computed, a surface interpolation performed, and the new mesh value deposited in the mesh at the (original) index.

For all j, k within:

$$J_{ul} \leqq j \leqq j_{lr}$$

$$k_{ul} \leqq k \leqq k_{lr}$$

do $$u=2Box(k=k_{org})/Res$$

$$v=2Box(j-j_{org})/Res$$

$$w=u+iv$$

$$z = R\frac{Aw}{B+Cw}$$

where A, B, C, and R are the complex numbers obtained above. Now convert z back to mesh indices to find the interpolation boundaries:

$$z=x+iy$$

$$k_{new}=Resx/(2Box)+k_{org}$$

$$j_{new}=Resy/(2Box)+j_{org}$$

Interpolate between the bounding integer values around $j_{new}$, $k_{new}$ in the prototype mesh to obtain the new mesh elements $M_x[j, k]$ and $M_y[j, k]$.

For the j, k outside of the range above, copy the prototype values:

$$j<j_{ul}; j>j_{lr}$$

$$k<k_{ul}; k>k_{lr}$$

$$M_x[j, k]=M_{protox}[j, k]$$

$$M_y[j, k]=M_{protoy}[j, k]$$

In the second stage, with the beginnings of the new mesh obtained by resampling the prototype, a linear scaling will produce the final desired mesh:

For all j,k do $$u=2Box(k-k_{org})/Res$$

$$v=2Box(j_{org}-j)/Res$$

$$w=u+iv$$

$$M_x = \frac{\sqrt{(v^2 = Z_{nom}^2)K_{nom}}}{\sqrt{(v^2 = Z_x^2)K_x}} \cdot M_x + \frac{v \cdot \tan\theta_{ortho}}{K\sqrt{(v^2 + Z_x^2)}} + T_x(0, 0)$$

$$M_y = \frac{\sqrt{(u^2 + Z_{nom}^2)K_{nom}}}{\sqrt{(u^2 + Z_y^2)K_y}} \cdot M_y + T_y(0, 0)$$

At this point the geometry alignment is completed. Focus and vignette remain.

Figure 8:
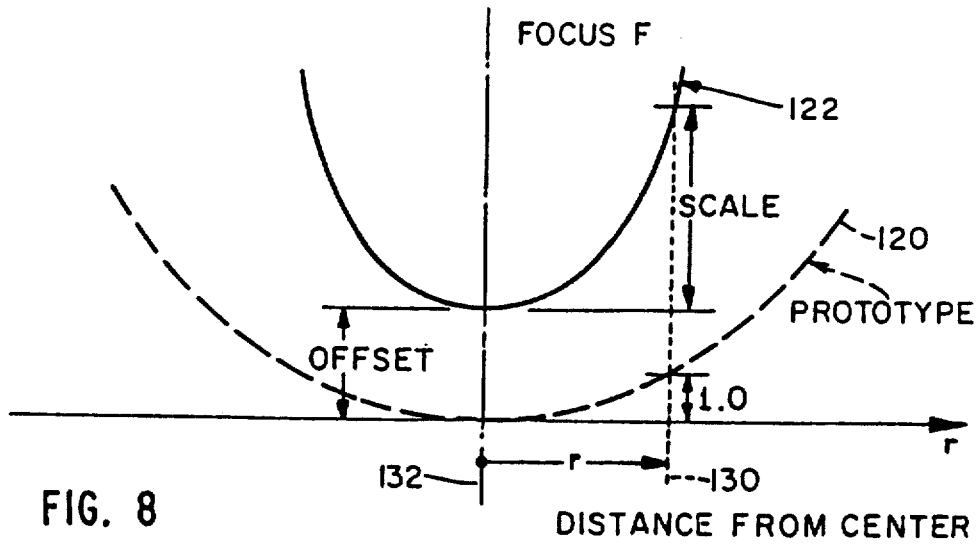
FIG. 8 is a graph showing offset and scale of the focus mesh.

The focus mesh control surface is a parabola 120 of FIG. 8. The minima of the parabola must be set at the correct value for the center of the image. This is an offset operation. The rate of curvature for the surface must be determined by one other point. Once the best focus for that point is obtained, the surface 122 is scaled (keeping the minima fixed) to intersect the point.

Figure 9:
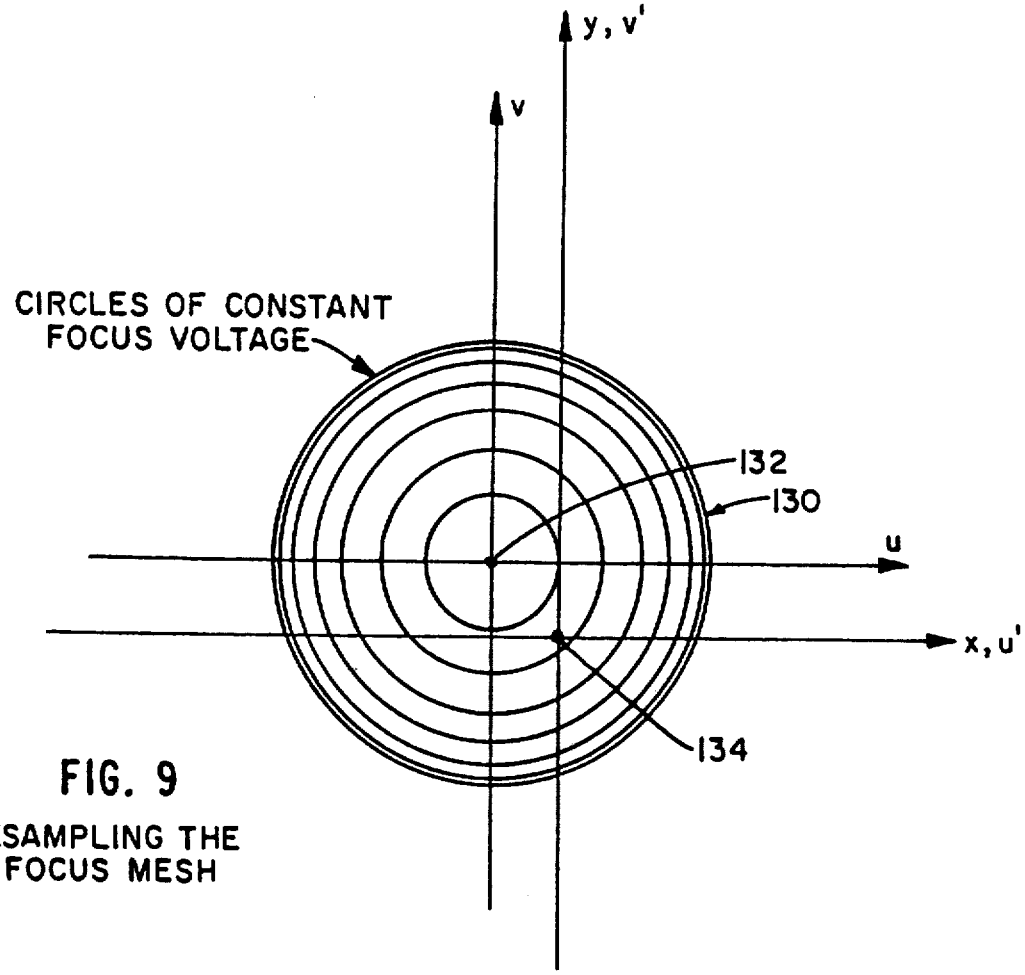
FIG. 9 is a two-dimensional view of a focus mesh.

As an example of resampling, assume, that, for some reason, the center 134 of the film image did not correspond to the minima 132 of the focus surface, FIG. 9. This might occur if the optical axis of the camera (alignment fixture) was not the same as the beam axis of the CRT. To correct for this error, it is necessary to resample the focus surface such that the mesh origin at u', v'=[0, 0] corresponds to the point on the surface where the film origin occurred. The mesh resampling should be performed on the portion of the mesh surface which contains the visible image.

The vignette correction is done in the same way as the focus correction in that an offset and a scaling operation are performed, this time using the vignette measurements to determine the magnitude of the adjustment.

The basic corrections to all of the mesh surfaces can be accomplished using these methods and variations of them. It is felt that the number of parameters required will be small, and that the measurements to obtain them few and easy to obtain.

Additional details of the mesh correction process follow. Centering, which provides the correction for the X and Y meshes, consists of adding the appropriate constant to all elements in the mesh in order to bring the origin of the mesh (u,v=[0, 0]) to the center of the image.

Static centering refers to the code required in the mesh to position the (nonmoving) beam at the center of the image. The prototype mesh assumed that the tube, yoke and deflection system was perfect and used the number 0 for this centering value (no offset).

Dynamic centering refers to the effects of the mesh filters. It can be considered to be the time delay between when a value is fetched by the geometry engine and when its effect reaches the beam. The prototype uses the delay of the nominal filter. Any variance from this filter model may cause a shift in the actual delay and introduce centering error. Note that this is a horizontal effect only, since the vertical rate of change is well beyond the averaging effects of the filter. The addition of an appropriate constant to all values in the X mesh will correct for any dynamic centering errors.

The measurement of the static center includes using a target on the alignment mask at the origin of the film coordinates, the beam is positioned by means of horizontal and vertical search methods to the center. The X and Y deflection control words are noted and saved.

The dynamic centering process provides a horizontal line segment to locate the frame center while scanning the line at the normal imaging rate. This is done using a nearly completed mesh (the dynamic centering correction is the last to be applied). Moreover, it is also possible to measure the X deflection filter response directly, using one of the diagnostic A/D channels. The diagnostic A/D (not shown, connected to mesh adjusting microprocessor 77) is selectively connected to one of sixteen test points in the system, such as at the deflection yoke, the focus power supply and other CRT signal paths. Thus, by putting step or impulse function values into the deflection DAC's (56, 60, 64, 68) and measuring the resulting analog circuit response through a loopback measurement system, the system performance is monitored. This would yield a value for the time delay which could be compared to the nominal delay. The difference is then converted to the additive constant for the mesh.

Scaling and pincushion correction are provided as follows. The prototype mesh has been computed for the nominal yoke position on the CRT. This involves use of the "beam radius", Z, which is the effective distance between the CRT face plate and the focal point of the deflection. The computation also includes a nominal value for the angular deflection gain, K, which specifies the sensitivity of the deflection angle to the mesh numeric values:

$$\sin \alpha = K \cdot M$$

where $\alpha$ is the deflection angle; M is the mesh value. In practice, each system will have different values for Z and K. There will also likely be different values of K in the horizontal and vertical directions. By measuring the true values for Z and K, it is possible to correct the mesh values for the new geometry.

Figure 10:
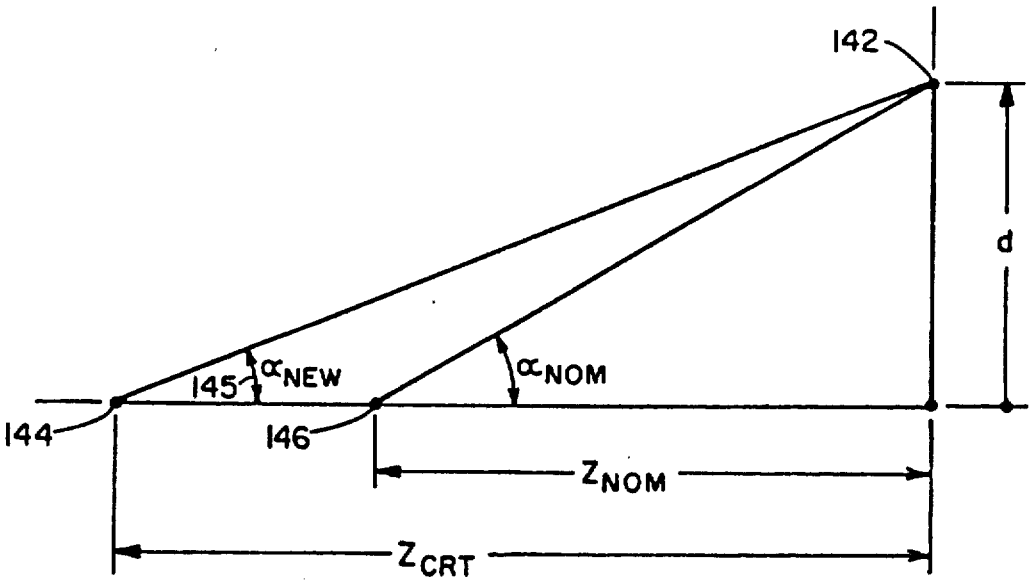
FIG. 10 is a graph showing beam radius change.
Figure 11:
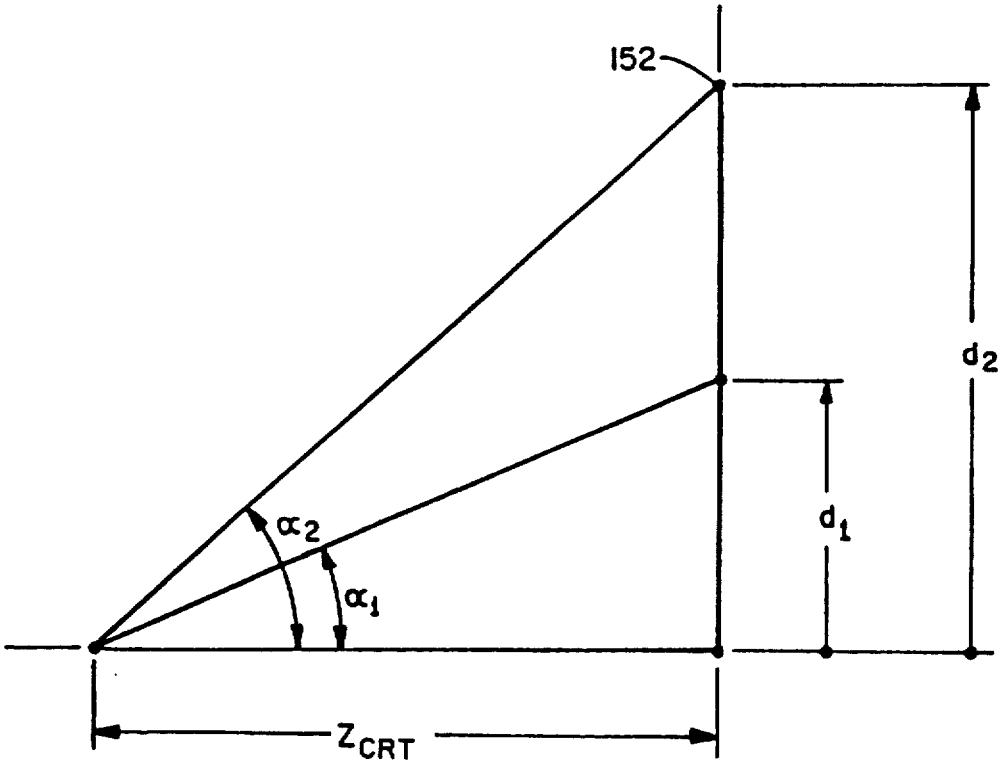
FIG. 11 is a graph showing measurements for computing beam radius deflections.

As shown in FIG. 10, the deflection angle $\alpha$, required to produce a given deflection d, is determined by:

$$\tan(\alpha) = d/z$$

To keep the deflection constant when the CRT beam radius $Z_{CRT}$ is different from the nominal radius $Z_{nom}$, a new angle (145, FIG. 10) must be computed:

$$a_{new} = \mathrm{atan}(d/Z_{CRT})$$

This correction must be done along both horizontal and vertical axes. The desired angles are:

$$\alpha_x = \arctan(x/\sqrt{(y^2 + Z_{CRT}^2)})$$

$$\alpha_y = \arctan(y/\sqrt{(x^2 + Z_{CRT}^2)})$$

The positions x and y are not the quantities available at each mesh coordinate. The original angles are known, however, through the deflection gain. So the desired x and y, can be obtained:

$$\alpha_{nomx} = K_{nom} M_{protox}$$

$$\alpha_{nomy} = K_{nom} M_{protoy}$$

$$x = \sqrt{(y^2 + Z_{nom}^2)} \tan \alpha_{nom\,x}$$

$$y = \sqrt{(x^2 + Z_{nom}^2)} \tan \alpha_{nom\,y}$$

The new angles are therefore obtained from the prototype mesh values by:

$$\alpha_{new\,x} = \mathrm{atan} \frac{\sqrt{(y^2 + Z_{nom}^2 \tan(K_{nom} M_{proto\,x})}}{\sqrt{(y^2 + Z_{CRT}^2)}}$$

$$\alpha_{new\,y} = \mathrm{atan} \frac{\sqrt{(x^2 + Z_{nom}^2 \tan(K_{nom} M_{proto\,y})}}{\sqrt{(x^2 + Z_{CRT}^2)}}$$

This can be simplified if $Z_{CRT} \approx Z_{nom}$:

$$M_{new\,x} = \frac{\sqrt{(y^2 + Z_{nom}^2) K_{nom}}}{\sqrt{(y^2 + Z_{CRT}^2) K_{CRT}}} M_{proto\,x}$$

$$M_{new\,y} = \frac{\sqrt{(x^2 + Z_{nom}^2) K_{nom}}}{\sqrt{(x^2 + Z_{CRT}^2) K_{CRT}}} M_{proto\,y}$$

This is an easy computation. All that is needed are values for $K_{CRT}$ and $Z_{CRT}$. $K_{nom}$ and $Z_{nom}$ are known (they are parameters used in generating the prototype mesh).

To obtain the actual beam radius and deflection gains three measurements are required. As shown in FIGS. 8 and 9, the location of the tube center 134, and two distinct deflections must be measured. The center point measurement was discussed above. Two other target locations on the alignment mask can be used to provide the known deflection distances $d_1$ and $d_2$ (known in film image coordinates). Using search techniques for positioning the static CRT spot, the required mesh values to position the spot over each target are obtaied. From the deflection measurements, along with the center value $M_1$, $M_2$, and $M_3$, and according to the geometry of the problem:

$$Z_{CRT}=d_2 \tan KM_1=d_1 \tan KM_2$$

To solve this for the deflection gain K, first write:

$$\frac{d_2 \tan KM_1}{d_1 \tan KM_2} = 1$$

To solve analytically, a simple numerical method can be employed. Let:

$$f(K) = 1 - \frac{d_2 \tan KM_1}{d_1 \tan KM_2}$$

Finding the value of K to make f(K) equal to zero, according to Newton's methods, the derivative of f(K) is required:

$$f'(K) = \frac{-d_2[\tan KM_2 M_1 \sec^2 KM_1 - \tan KM_1 M_2 \sec^2 KM_2]}{d_1 \tan^2 KM_2}$$

This technique converges very rapidly, and given a reasonable initial approximation for K($K_{nom}$ is a good choice), only a few iterations of the algorithm are required.

Once $K_{CRT}$ is computed, $Z_{CRT}$ is found by:

$$Z_{CRT}=d_2/\tan K_{CRT}M_2$$

Note that the distances and consequently $Z_{CRT}$ (144, FIG. 10), are in image frame coordinates. Since $Z_{CRT}$ and $K_{CRT}$ are used in ratios with $Z_{nom}$ (146, FIG. 10) and $K_{nom}$, the actual dimensions used are arbitrary, so long as they are consistent.

The beam radius and the deflection gain characterize the pincushion correction required to produce a rectilinear image. By making the measurements at the film plane in the alignment module, correction of the camera lens pincushion distortion occurs at the same time. The two sources of distortion (CRT and camera) combine at the film as an "effective" single distortion which can be corrected by an equivalent beam radius and deflection gain. This is what is actually computed by making the measurements and computations described above. This correction assumes that the magnification of the prototype mesh and the pincushion corrected mesh are the same. This entered into the correction equation by keeping the net deflection d, 142, the same (FIG. 10). If the tolerance on the camera position and/or lens focal lengths results in a change in magnification, the deflection distance must change in order to maintain a constant image size. This requires a correction which resamples the control surface in order to preserve the pincushion correction and at the same time create the desired image size. Since it is expected that the magnification errors will be small, it is suggested that they be corrected within the pincushion correction. The residual distortion should fall within the acceptance tolerances for pincushioning.

Figure 12:
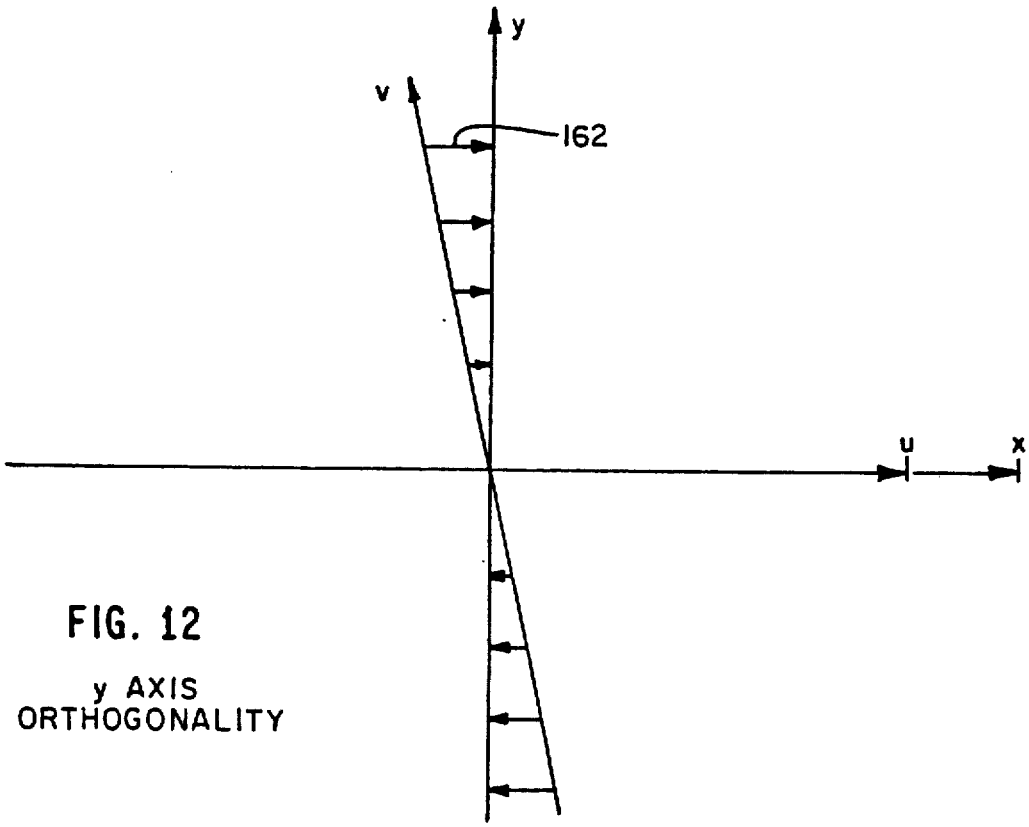
FIG. 12 is an illustration of orthogonality errors.
Figure 13:
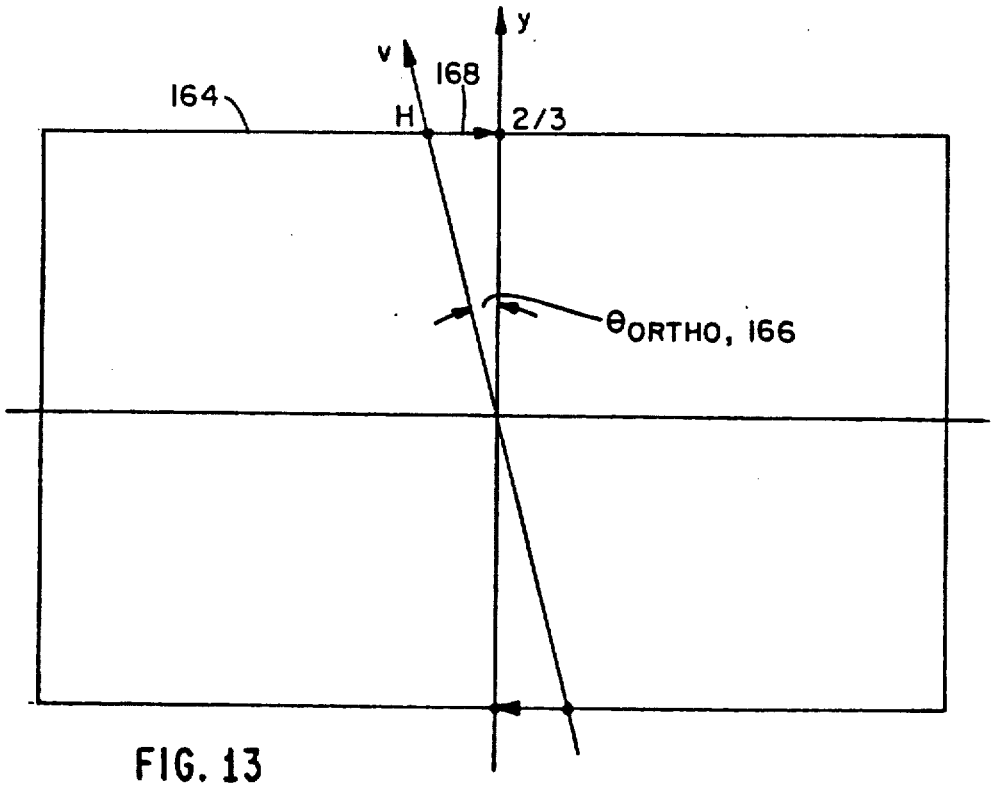
FIG. 13 is a drawing showing the amplitude of the orthogonality correction signals.

The yoke will have some amount of nonorthogonality between the x and y coils. This can be compensated for by the mesh. The recommended method for accompanying this is to manually align the horizontal deflection when the yoke is assembled onto the tube. This is an operation which is provided by accurate manufacturing of the yoke. Any remaining errors will be removed at a later stage, discussed below. As shown in FIG. 12, the Y axis can now be measured and its orthogonality to X computed. The "shear" 162 of the Y axis can be removed by adding the correct constant 168 to each row in the X mesh, FIG. 13. The number will be different for each row. A linear correction is easily accomplished which adds zero at the origin and gradually increases in magnitude for rows closer to the top or bottom of the frame.

Using targets (100, FIG. 3) at the center, right edge, and top edge 164 of the alignment frame, make position measurements $M_C$, $M_r$, $M_t$. Compute angles $\theta_x$, and $\theta_y$:

$$\theta_x = \operatorname{atan} \frac{y_r - y_c}{x_r - x_c}$$

$$\theta_y = \operatorname{atan} \frac{y_t - y_c}{x_t - x_c}$$

The orthogonality error angle 166 is the difference between the Y axis angle and the line which is perpendicular to the X axis:

$$\theta_{ortho}=\theta_y-(\theta_x+90^\circ)$$

The gradient of the Y axis error is represented by this angle. The absolute amplitude is obtained from some additional geometry, shown in FIG. 13. The distance H at the film plane can be computed from:

$$H=(\xi) \tan \theta_{ortho}$$

This is the maximum horizontal shift to be made. It occurs at the top row of the mesh, and also at the bottom row, though opposite in direction. The mesh constant, $M_{ortho}(H)$, that must be added is the angle required to produce H. This will be:

$$KM_{ortho}(H)=\arctan(H/\sqrt{(y^2+Z^2)})$$

$$K_{ortho}(H)=(1/K) \arctan(H/\sqrt{(y^2+Z^2)})$$

where K is the deflection gain and Z is the beam radius as determined earlier.

Because the error angle is small, the arctangent function may be approximated by its argument; and, since the correction will be a linear function of Y (and hence of the mesh coordinate V), the required constants to add to each row of the X mesh:

$$M_{ortho}(v) = \frac{H}{K\sqrt{(v^2 + Z^2)}} \frac{v}{(\S)} = \frac{v\tan\theta_{ortho-}}{K\sqrt{(v^2 + Z^2)}}$$

Figure 14:
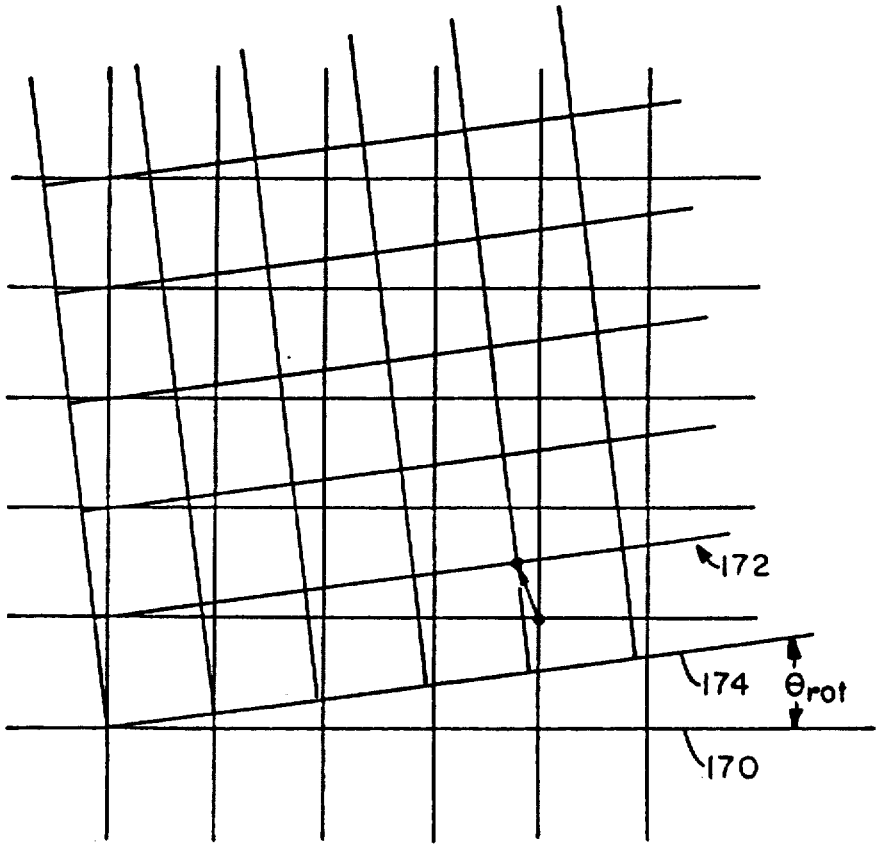
FIG. 14 is a drawing showing the correction for mesh rotation errors.

Now that the Y axis of the image is orthogonal to the X axis, it is necessary to align the U axis of the mesh (row direction) with the horziontal (x) axis on the film. This cannot be done by a linear operation. Instead, the mesh coordinates must be rotated, and the control surface 172 resampled at the new array index locations 174 shown in FIG. 14.

First, the amount of rotation required is measured. The data to determine this has already been obtained by previous alignment mask target measurements $M_r$ and $M_c$. In fact, the rotation angle has already been computed as part of the orthogonality correction:

$$\theta_{rot} = \theta_x = \text{atan}\frac{y_r - y_c}{x_r - x_c}$$

In order to perform the resampling a new set of mesh index locations must be computed. These are obtained from the old locations by the transformation:

$$u_{new} = u_{old}\cos\theta_{rot} - v_{old}\sin\theta_{rot}$$

$$v_{new} = u_{old}\sin\theta_{rot} + v_{old}\cos\theta_{rot}$$

Figure 15:
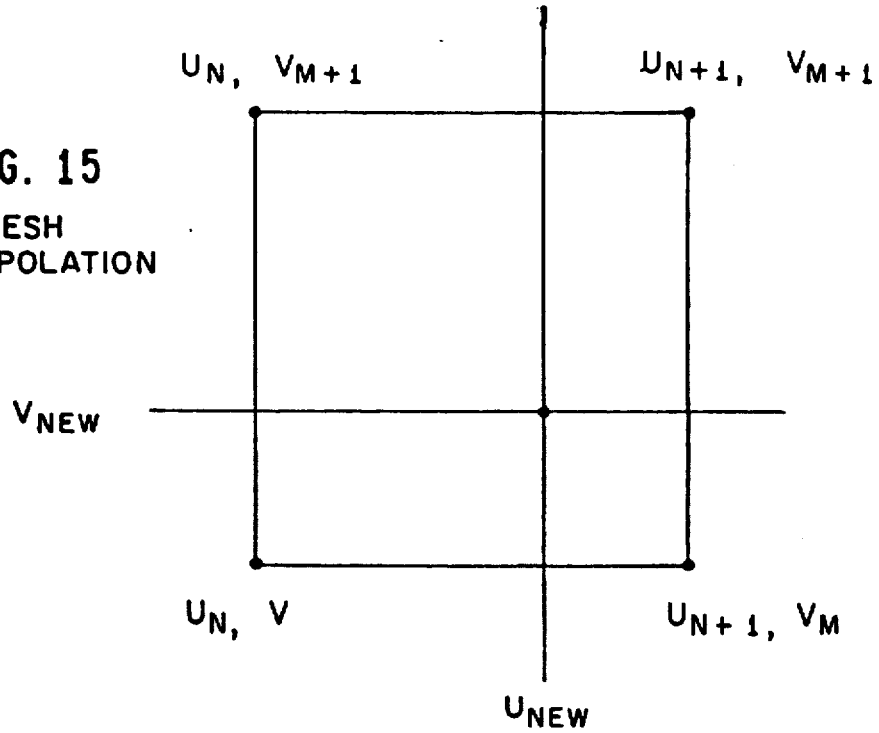
FIG. 15 is a drawing showing mesh interpolation according to the present invention.

In general, the new locations will be different from the old coordinates. To compute the new mesh value an interpolation of the mesh surface is done. As an example of this linear interpolation on a surface, say that $u_{new}$ falls between old mesh coordinates $u_n$ and $u_{n+1}$, shown in FIG. 15, and that $v_{new}$ lies between $v_m$ and $v_{m+1}$. First compute the mesh values where $v_{new}$ intersects the vertical lines at $u_n$ and $u_{n+1}$. They occur at $(u_n, v_{new})$. Then interpolate between these two numbers to obtain the value at $u_{new}$:

$$M(u_n,v_{new}) = \frac{v_{new} - v_m}{v_{m+1} - v_m}\cdot(M(u_n,v_{m+1}) - M(u_n,v_m)) + M(u_n,v_m)$$

$$M(u_{n+1},v_{new}) = \frac{v_{new} - v_m}{v_{m+1} - v_m}\cdot(M(u_{n+1},v_{m+1}) - M(u_{n+1},v_m)) + M(u_{n+1},v_m)$$

$$M(u_{new},v_{new}) = \frac{u_{new} - u_n}{u_{n+1} - u_n}\cdot(M(u_{n+1},v_{new}) - M(u_n,v_{new})) + M(u_n,v_{new})$$

The computation of $u_{new}$, $v_{new}$, and its new mesh value must be done for every element in the viewable portion of the mesh.

To reduce the visual effects of any residual nonlinear second and third order effects distortions, a conformal mapping method is provided. The bilinear transform, in complex number theory, offers the opportunity to map three points in one (distorted) coordinate system to three corresponding points in the desired coordinate system. This type of correction is a resampling technique similar to the rotation correction just described. It involves the computation of new u, v numbers using a more complicated formula than the rotation correction however.

The three mapping points will be the upper left, the center, and the lower right ends of the image frame. Since this line spans both axes, it is expected that the distortion correction will be fairly uniformly distributed over the frame. In addition, the transformation will guarantee that these points fall exactly on the desired locations in the final image.

The procedure starts by obtaining measurements of the mapping points using targets on the alignment mask. Call these measurements $M_{ul}$, $M_c$, and $M_{lr}$. The alignment corrections and the pincushioning must be "undone" in order to convert these numbers to image frame coordinates. This can be accomplished in stages using information already obtained. The sequence is:

First, remove the centering correction. The centering correction to the prototype mesh consisted of adding the center measurement $M_c$. This means that to obtain a prototype mesh value from a measured value, the center must be subtracted:

$$M_1 = M - M_c$$

Second, undo the pincushion correction. This was initially performed in the prototype mesh generation. It must now be reversed to get back to image frame coordinates. The reverse operation is:

$$M_2 = r(x,y)\sin(KM_1)$$

where K is the system's measured angular deflection gain, and r(x, y) is the distance from the beam focal point to the screen:

$$r(x,y) = \sqrt{(x^2 + y^2 + z^2)}$$

Z is the system's measured beam radius.

Third, remove the orthogonality correction. Whereas $M_{ortho}(\theta_{ortho}'v)$ was added to each prototype mesh value (after pincushion correction), it must now be subtracted:

$$M_3 = M_2 - M_{ortho}(\theta_{ortho}\, v)$$

Fourth, rotate the measurements back to their unaligned positions:

$$M_r = R_{rot}(-\theta_{rot})M_3$$

$R_{rot}$ is the rotation transformation (in vector notation) operationg on the measurement vector $M_2$. The individual equations were described previously.

$M_4$ represents the measurement in image frame coordinates. If there were no distortion remaining after the mesh corrections described, the measured coordinates would match the desired image coordinates. In general, only $M_{4c}$ will be exactly correct (it is guaranteed to be zero). The technically "proper" thing to do with the measurements would be to perform the bilinear transform on the desired image frame coordinates and "predistort" them. This misshapened set of coordinates are then used as the starting points in the mesh generation procedure and a new prototype mesh created. This is followed by all of the aligned corrections previously determined and the best mesh producible by this method would result.

Since generating a new prototype mesh from image coordinates is a lengthy and compute intensive task, this is not a practical solution. Instead, it will be assumed that the distortion corrections are small, and that by predistorting the mesh coordinates and resampling the mesh surface, an approximation to the true solution will result. The transformation to the mesh coordinates is specified by the $M_4$ measurements. What is desired is for the corners and center of the mesh to map into the $M_4$ locations. Referring to the u, v coordinates of the prototype mesh as w, and the x, y coordinates of the resampled mesh as z, the transformation requires:

$$w_{ul} \rightarrow z_{ul} = M_{4ul}$$

$$w_c \rightarrow z_c = M_{4c}$$

$$w_{1r} \rightarrow z_{1r} = M_{41r}$$

Since $w_c = z_c = 0$, the transformation simplifies to:

$$z = \frac{M_{ul} m_{1r}(w_{1r} - w_{ul})w}{(M_{1r} - M_{ul})w_{ul}w_{1r} + (w_{1r}M_{ul} - w_{ul}M_{1r})w}$$

The way this formula is used is to substitute the corner values of the mesh indices:

$$w_{ul} = [-1, \S]$$

$$w_{1r} = [1, -\S]$$

and the values for the measured corners:

$$M_{ul} = M_{4ul}$$

$$M_{1r} = M_{41r}$$

The formula is in the complex number domain and represents a vector opertion. It can be written as:

$$z = \frac{A \cdot w}{B + C \cdot w}$$

where A, B, and C are complex numbers obtained from:

$$A = M_{ul}M_{1r}(w_{1r} - w_{ul})$$

$$B = (M_{1r} - M_{ul})w_{ul}w_{1r}$$

$$C = w_{1r}M_{ul} - w_{ul}M_{1r}$$

The present invention also provides film images which are predistorted. The predistortion is provided by defining an image boundary which complements and corrects for the distortion and adjusting the mesh accordingly. For instance, a Keystone distortion would require adjusting the mesh to form an inverted Keystone; projection on a sphere would require the mesh to be adjusted to provide severe pincushion predistortion, and so forth.

Figure 16:
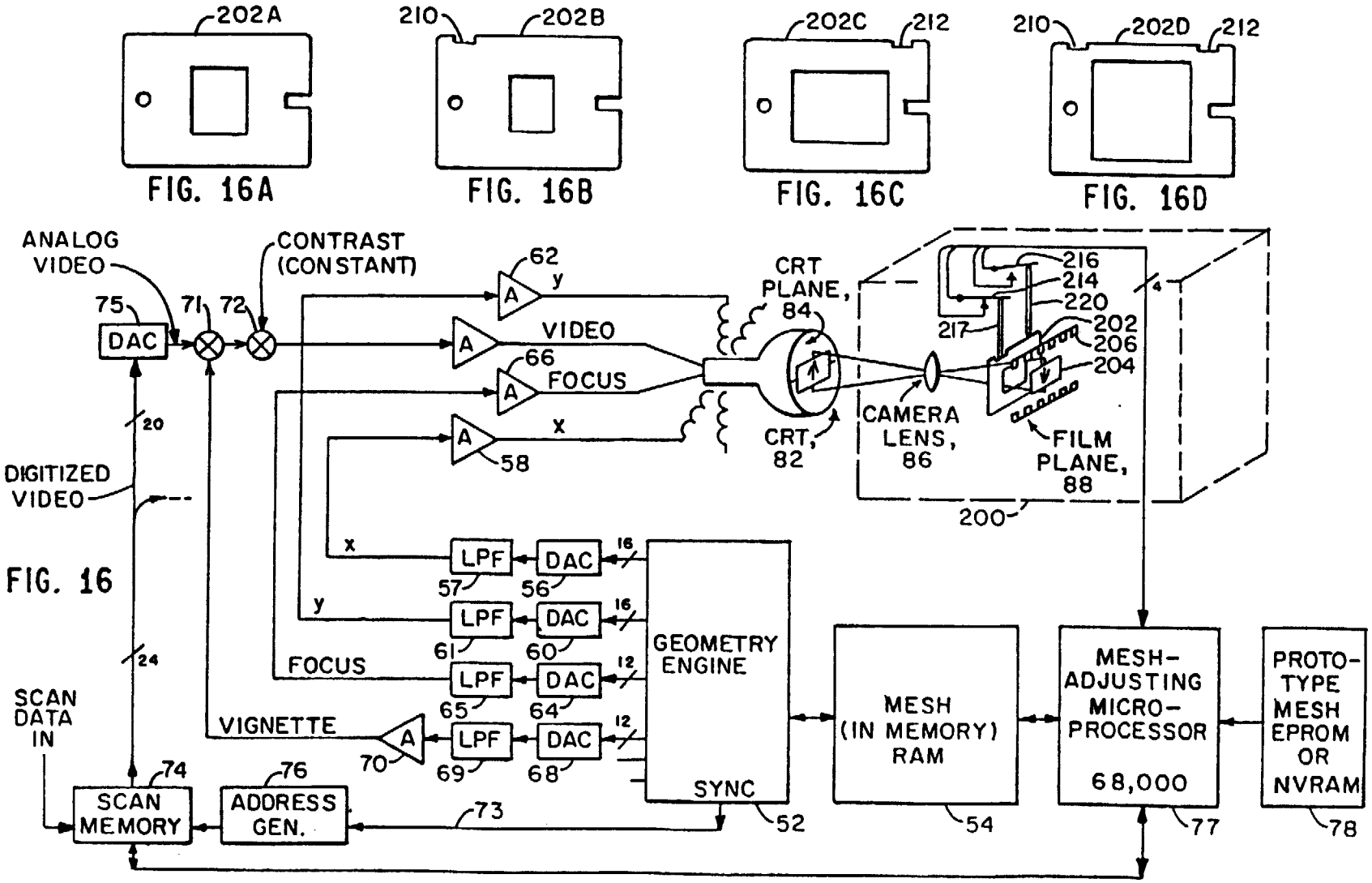
FIG. 16 is a block drawing showing one embodiment of the present invention wherein the CRT image is selectively adjusted according to removable, encoded film aperture plates.

The image parameters, such as image size and position are also altered according to the various formats of the films to be used. The present invention automatically accommodates a variety of film formats in a common enclosure 200 which is adapted to the particular film formats, such as 16 mm, 35 mm and 46 mm films with removable and interchangeable mechanical support within the enclosure 200, FIG. 16. However, since the film aperture plates 202 define the image 204 size and position on the film 206, the particular film aperture plates 202A-D, FIG. 16A, used signal the mesh adjusting microprocessor 77 to adjust the image position and size parameters to the CRT 82. The aperture plates 202 (202B-D, FIGS. 16B-D) are encoded with recesses 210, 212 which are read by switches 214, 216 and linkage pins 218, 220, respectively. Thus, for one of four apertures, two aperture positions provide sufficient encoding ($2^2$) to indicate a unique film aperture to the mesh adjusting microprocessor 77, which provides the corresponding CRT image adjustment. Other aperture encoding methods, such as electrical or optical are also envisioned, and the encoded signal may be adjusted to accommodate a larger variety of aperture plates or other interchangeable enclosure 200 components.

Another feature of the present invention, called Pixel Replication, is designed to eliminate the problem encountered by film recorders which support more than one resolution CRT image. When changing from a higher resolution to a lower resolution CRT image, one encounters the problem of trying to keep the film exposure constant so that the film density and color balance will remain the same. Other film recorders do this by either increasing the exposure time per pixel at the lower resolution or by increasing the CRT beam current. Both of these techniques introduce errors because the corrections are nonlinear and therefore require correction via compensation tables that must be changed for each resolution. The apparatus according to the present invention solves this problem by, in effect, always running at the higher resolution. When a reduced resolution picture is exposed (at either half or one quarter of the highest resolution), the present invention automatically draws each pixel four or sixteen times as necessary (i.e, doubles or quadruples the pixel in both the X and Y direction). This is performed by the mesh adjusting processor 77 from image data in the scan memory 74, by repeating the appropriate memory 74 address. Thus, the nonlinear image problems are avoided and the film exposure remains constant.

Moreover, while other film recorders modify the film exposure by controlling either the duration of each pixel (time modulation) or the brightness of each pixel (intensity modulation), the present invention uses a combination of both. Depending on the horizontal sweep speed, each pixel is divided into between 6 and 256 time slices. In each pixel, the present invention can set any number of the time slices to a full intensity setting, and one slice may be set to any of 4096 settings. This process gives a finer control of film exposure than the traditional techniques, and representative values of time and intensity are shown in Table I, below. The table variables are defined as follows:

Count—number of time units (62.5 nsec each) of full amplitude video signal in a pixel.

Partial—Expressed as a value from 0 to 1 (non inclusive). It represents the fraction of full amplitude video signal used for 1 time unit following the count full amplitude time units.

Slices—Number of time units in each pixel. Slices ≧ Count + 1 After drawing Count + 1 time units, the remaining portion of a pixel (Slices − Count − 1) is drawn to zero amplitude.

Contrast—A voltage level selected to produce a bright white as determined by film sensitivity; other parameters then adjusted for gray scale.

In the following tables, slices = 16

| Count | Partial | Light output for 256 pixels Contrast = 5.09 | Contrast = 3.35 | Contrast = 3.30 |
|---|---|---|---|---|
| 0 | 0 | 16 | 2 | 1 |
| 3 | 0 | 192 | 20 | 12 |
| 4 | 0 | 560 | 56 | 32 |
| 5 | 0 | 1120 | 108 | 61 |
| 6 | 0 | 1776 | 186 | 103 |
| 7 | 0 | 2512 | 278 | 154 |
| 8 | 0 | 3376 | 384 | 215 |
| 8 | ½ | 3712 | 430 | 241 |
| 9 | 0 | 4208 | 502 | 279 |
| 9 | ½ | 4576 | 550 | 307 |
| 10 | 0 | 5104 | 628 | 350 |
| 10 | ½ | 5488 | 680 | 380 |
| 11 | 0 | 6016 | 760 | 426 |
| 11 | ½ | 6416 | 820 | 459 |
| 12 | 0 | 6992 | 912 | 511 |
| 12 | ½ | 7456 | 980 | 550 |
| 13 | 0 | 8048 | 1082 | 609 |
| 13 | ½ | 8608 | 1166 | 656 |
| 14 | 0 | 9280 | 1276 | 720 |
| 14 | ½ | 9952 | 1386 | 782 |
| 14 | ¾ | 10368 | 1452 | 821 |
| 15 | 0 | 10768 | 1512 | 853 |
| 15 | ¼ | 11264 | 1604 | 905 |
| 15 | ½ | 11856 | 1732 | 979 |
| 15 | ¾ | 12480 | 1868 | 1061 |
| 15 | 4095/4096 | 12944 | 1982 | 1130 |

Other embodiments and modifications of the present invention by one skilled in the art, such as alignment of a laser, rather than a CRT based image system, are within the scope of the present invention, which is not to be limited, except by the claims which follow:

What is claimed is:

1. An image recorder providing a photographic copy of a CRT image at an image plane onto a photographic film disposed on a film plane in spatial relationship apart from said image plane, comprising:

lens means for transforming said image from said image plane to said photographic film;

an alignment mask having a target image thereon overlaying said image at said image plane;

means to selectively illuminate the CRT according to at least one of a deflection signal and an intensity signal;

photodetector means responsive to said target image selectively illuminated by said CRT and producing a target signal therefrom; and means for adjusting at least one of said deflection signals and said intensity signal according to said target signal in response to said target signal, wherein correction for at least one of image position, rotation, orthogonality, pincushion and size are provided.

2. The image recorder of claim 1, wherein said alignment mask comprises a clear plate *having* at least one opaque target thereon.

3. The image recorder of claim [2] *1*, further including focus adjustment means responsive to said target signal to provide a focused image on said photographic film.

4. The image recorder of claim 3, wherein said focus adjustment means comprises means for adjusting the focus of said CRT image.

5. The image recorder of claim [4] *1*, wherein said CRT image comprises a spot, and said target signal corresponds to the intensity of the CRT image and said means for adjusting the focus of said CRT provides a minimum target signal.

6. The image recorder of claim [5] *1*, wherein said alignment mask includes a plurality of said opaque targets distributed over said image plane, said means for adjusting provides said corrections at said targets, and further includes interpolation means for providing said corrections adjacent to said targets.

7. The image recorder of claim 6, wherein said means for adjusting includes:

means for detecting an edge of said opaque target; and means for determining the position of said CRT image according to the detected edge of said target.

8. The image recorder of claim [7] *1*, wherein said means for selectively including means to provide a movable illuminated focused spot, and wherein said means for adjusting further includes means for determining the intensity profile of said spot; and means for adjusting the focus of said spot according to said intensity profile.

9. The image recorder of claim [8] *1*, wherein said means for adjusting includes a prototype mesh for providing preliminary correction.

10. The image recorder of claim 9, wherein said means for adjusting further includes a mesh correction processor responsive to said prototype mesh and said sampled target signal, and providing a corrected mesh signal.

11. The image recorder of claim [10] *1*, wherein said means for adjusting includes at least one of:

means for sampling the target signal;

multiplication means for providing scaling correction to at least one image characteristic[s] including image position, rotation, orthogonality, pincushion, size and vignette according to the sampled target signal; and addition means for providing an offset correction to at least one image characteristic including image position, rotation, orthogonality, pincushion, size and vignette according to the sampled target signal.

12. The image recorder of claim [11] *1*, wherein said means for adjusting further includes a random access memory for storing said corrected mesh signal.

13. The image recorder of claim 12, wherein said means for adjusting further includes a geometry engine providing control signals to the CRT including at least one of deflection, focus and vignette signals.

14. An image recorder providing a photographic copy of a CRT image at an image plane on a photographic film disposed on a film plane in spatial relationship apart from said image plane comprising:

means for transforming said image from said image plane to said photographic film;

an alignment mask disposed at said film plane having a target image thereon;

means to selectively illuminate the CRT according to at least one of a deflection signal and an intensity signal;

photodetector [positive] means to receive said target image selectively illuminated by said CRT and producing a target signal therefrom; and means for adjusting at least one of said deflection signals and said intensity signal according to said target signal in response to said target signal, wherein correction for at least one of image position, rotation, orthogonality, pincushion and size are provided.

15. The image recorder of claim 14 wherein said photographic film is contained within a first removable module, and said alignment mask is contained within a second removable module, wherein said first and second removable modules are selectively interchangeable.

16. The image recorder of claim [15] *14* wherein said photographic film is displaced from said film plane and said alignment mask is substituted in the place of the film during adjustment by said means for adjusting.

17. An image recorder providing a photographic copy of a CRT image at a CRT plane on a photographic film, comprising:

a film holder including an aperture plate having an aperture therein corresponding to a selected film format and also having means for providing an encoded signal corresponding to said selected format;

encoded signal sense means providing a format signal according to said aperture plate recess;

a CRT display providing said CRT image in response to a video signal and an adjustment signal; and image adjustment means providing said adjustment signal in response to format size signals for adjusting the CRT image size and position according to said format signals.

18. The image recorder of claim 17, wherein said mechanical encoded signal is provided by recesses in said aperture plate, *and* said encoded signal sense means comprises mechanical switches operative according to the presence of said recesses.

19. An image recorder providing a photographic copy of a CRT image at a CRT plane on a photographic film disposed on a film plane in spatial relationship in an optical path apart from said CRT plane, comprising:

lens means for transforming said CRT image from said CRT plane to said photographic film;

an alignment mask interposed in said optical path between said film plane and said CRT plane having a target image thereon;

means for selectively illuminating the CRT according to at least one of a deflection signal and an intensity signal;

photodetector means positioned to receive said target image selectively illuminated by said CRT and producing a target signal therefrom; and means for adjusting at least one of said deflection signals and said intensity signal according to said target signal in response to said target signal, wherein correction for at least one of image position, rotation, orthogonality, pincushion and size are provided.

20. The image recorder of claim 19, wherein said target image comprises one of an opaque, a transparent and a reflective target image.

21. The image recorder of claim 19, wherein said optical path includes a mirror.

22. An image recorder providing a photographic copy of a CRT image at a CRT plane on a photographic film disposed on a film plane in spatial relationship apart from said CRT plane, comprising:

lens means for transforming said CRT image from said CRT plane to said photographic film;

an alignment mask overlaying said CRT image at a focal point of said lens means, and having a target image thereon;

means for selectively illuminating the CRT according to at least one of a deflection signal and an intensity signal;

photodetector means positioned to receive said target image selectively illuminated by said CRT and producing a target signal therefrom; and means for adjusting at least one of said deflection signal and said intensity signal according to said target signal in response to said target signal, wherein correction for at least one of image position, rotation, orthogonality, pincushion and size are provided.

23. An image [recorded] *recorder*, comprising:

CRT display means selectively providing a two-dimensional CRT image according to one of a plurality of image spatial density of pixels including a higher and a lower pixel density image, wherein each said image [pixel] density comprises a particular two-dimensioned array of pixels; and camera means for recording said CRT image on photographic film, wherein said CRT display means includes means for replicating pixels of said lower pixel density image [at said two-dimensional array corresponding] to said higher [image resolution] *pixel density image* to permit color matching on film.

24. The image recorder of claim 23, wherein said means for replicating provides even multiple replications of the lower resolution image pixels in the two dimensions of the CRT display.

25. A method of alignment of an image recorder having a CRT and a photographic film disposed on a film plane, comprising the steps of:

providing an alignment target;

generating a deflection signal according to expected X and Y positions;

selectively illuminating said alignment target with a point light source from said CRT according to said deflection signal, wherein said alignment target partially obscures said selective illumination;

detecting the selectively obscured illumination;

calculating the intensity profile of said point light source; and adjusting the focus of said point light source according to said intensity profile.

26. The method of claim 25, further including the steps of:

calculating the position of said point light source;

comparing the calculated position of said point light source to a specified position and providing an error signal therefrom; and adjusting said expected position signal according to said error signal.

27. The method of claim 26, further including the step of:

adjusting said expected position signal to provide correction for at least one of image position, image rotation, coordinate nonorthogonality, pincushion distortion and size distortion.

28. The method of claim 27, wherein said step of adjusting said expected position signal includes the step of generating a prototype position.

29. A method of aligning a CRT display, comprising the steps of:

providing a prototype mesh having preliminary display parameters therein;

correcting said prototype mesh by mask measurements of a predetermined image *to provide a final desired mesh;* storing [corrected mesh parameters] *said final desired mesh;* generating [display parameters] *correct display parameters frmo said final desired mesh;*

[correcting display parameters by said corrected mesh parameters;] and displaying image with [corrected] *said correct* display parameters.

*30. Apparatus for positioning a beam on a scanning-type display comprising:*

*a data mesh containing a set of error corrected deflection values for a plurality of coordinates defining an area of said display, each value corresponding to at least one beam characteristic and derived from a set of alignment factors, said alignment factors representing a parametric model uniquely defining and encompassing the specific characteristics, including errors, of said display;*

*memory means for storing said data mesh;*

*means coupled to said memory means for retrieving and converting said data mesh values to deflection signal necessary to correctly position said beam on the display in accordance with said parametric model; and*

*means for driving said display with said deflection signals.*

*31. The apparatus of claim 30, further comprising:*

*means for storing a prototype mesh derived from a set of nominal factors that represent a nominal model of said display;*

*means for sampling deflection signals necessary to position said beam at target points on the display;*

*means responsive to said sampling means for generating said alignment factors; and*

*means for adjusting said prototype mesh to provide said data mesh based on differences between said alignment factors and said nominal factors.*

*32. Apparatus in accordance with claim 30, wherein said alignment factors include intensity parameters for said display, and said converting means converts corresponding mesh values to an intensity signal for controlling the intensity of said beam.*

*33. Apparatus in accordance with claim 30, wherein said alignment factors include focus parameters for said display, and said converting means converts corresponding mesh values to a focus signal for controlling the focus of said beam.*

*34. Apparatus in accordance with claim 30, wherein said data mesh comprises a plurality of mesh control surfaces, each surface containing a two-dimensional array of values for conversion to a difference beam control signal.*

*35. Apparatus in accordance with claim 34, wherein said beam control signals include X position, Y position, focus, and intensity.*

*36. Apparatus in accordance with claim 30, further comprising:*

*means for adjusting said data mesh to compensate for distortions in an image input to said apparatus for display.*

*37. Apparatus in accordance with claim 30 further comprising:*

*means for interpolating said data mesh to provide an expanded set of mesh values for conversion into deflection signals.*

*38. Apparatus in accordance with claim 30 wherein said converting means comprises at least one digital to analog converter.*

*39. Apparatus in accordance with claim 38 further comprising a low pass filter coupled to an output of said digital to analog converter.*

*40. An image generator comprising:*

*a data mesh containing a set of error corrected values for a plurality of coordinates defining an image area of said image generator, said values being derived from a set of alignment factors representing a parametric model uniquely defining and encompassing the specific characteristics, including errors, of said image generator;*

*memory means for storing said data mesh;*

*means coupled to said memory means for retrieving and converting said data mesh values to image generator control signals;*

*means for inputting image information to said image generator; and*

*means responsive to said control signals for outputting said image information in a correct format based on said parametric model.*

*41. Alignment apparatus for use in combination with the image generator of claim 40, comprising:*

*a prototype mesh derived from a set of nominal factors that represent a nominal model of said image generator;*

*means for producing alignment control signals to output an image via said image generator in accordance with predetermined criteria;*

*means for sampling the alignment control signals when said predetermined criteria are met; and*

*means responsive to said sampling means for revising said prototype mesh to produce said data mesh based on differences between alignment factors derived from the sampled alignment control signals and said nominal factors.*

*42. Apparatus in accordance with claim 41, wherein said image generator is a scanning-type display.*

*43. Apparatus in accordance with claim 42 wherein said alignment control signals comprise at least one of a position control signal, intensity control signal, and focus control signal.*

*44. Apparatus in accordance with claim 42, wherein said data mesh comprises a plurality of mesh control surfaces, each surface containing a two-dimensional array of values for a different parameter of said display.*

*45. Apparatus in accordance with claim 44 wherein a mesh control surface contains values relating to the positioning of an image on said display.*

*46. Apparatus in accordance with claim 44 wherein a mesh control surface contains values relating to the intensity of an image on said display.*

*47. Apparatus in accordance with claim 44 wherein a mesh control surface contains values relating to the focus of an image on said display.*

*48. Apparatus in accordance with claim 40, wherein said data mesh contains adjusted values to compensate for distortions in an image input to said image generator.*

*49. Apparatus in accordance with claim 40 wherein said data mesh comprises a plurality of mesh control surfaces,*

*each surface containing a two-dimensional array of values for a different parameter of said image generator.*

*50. A method for aligning an image display comprising the steps of:*

*deriving a prototype mesh from a set of nominal factors that represent a nominal model of a display;*

*sampling alignment control signals used to display an alignment image on said display in accordance with predetermined criteria;*

*adjusting said prototype mesh based on differences between alignment factors derived from said sampled alignment control signals and said nominal factors to provide a final desired mesh containing a set of final control values for a plurality of coordinates defining an area of said display, said final control values accounting for errors in said prototype mesh; and*

*generating display control signals in accordance with said final desired mesh instead of said prototype mesh.*

*51. A method in accordance with claim 50 comprising the further step of:*

*interpolating said final mesh to provide an expanded set of mesh values for use in computing said display control signals.*

*52. A method in accordance with claim 50 wherein said display control signals comprise an image position signal.*

*53. A method in accordance with claim 52 wherein said display control signals comprise an intensity signal.*

*54. A method in accordance with claim 53 wherein said display control signals comprise a focus signal.*

* * * * *

UNITED STATES PATENT AND TRADEMARK OFFICE

CERTIFICATE OF CORRECTION

PATENT NO. : Re. 33,973

DATED : June 23, 1992

INVENTOR(S) : Kriz, et al.

It is certified that error appears in the above-identified patent and that said Letters Patent is hereby corrected as shown below:

In claim 29, at column 23, line 14, "frmo" should read -- from -- .

In claim 30, at column 23, line 31, "signal" should read -- signals -- .

Signed and Sealed this

Tenth Day of August, 1993

*Attest:*

*Attesting Officer*

Michael K. Kirk

MICHAEL K. KIRK

*Acting Commissioner of Patents and Trademarks*